United States Patent [19]

Kouno et al.

[11] Patent Number: 5,239,183
[45] Date of Patent: Aug. 24, 1993

[54] OPTICAL GAP MEASURING DEVICE USING FRUSTRATED INTERNAL REFLECTION

[75] Inventors: Motohiro Kouno; Ikuyoshi Nakatani; Takamasa Sakai; Sadao Hirae, all of Kyoto, Japan

[73] Assignee: Dainippon Screen Mfg. Co., Ltd., Japan

[21] Appl. No.: 869,816

[22] Filed: Apr. 16, 1992

Related U.S. Application Data

[63] Continuation-in-part of Ser. No. 707,152, May 29, 1991.

[30] Foreign Application Priority Data

Apr. 30, 1991 [JP] Japan ................................ 3-128670

[51] Int. Cl.$^5$ ............................................ G01N 21/86
[52] U.S. Cl. ................................... 250/561; 356/376
[58] Field of Search .............. 250/561, 216; 359/222, 359/833; 385/14; 73/655, 705, 761, 800; 356/373, 375, 376

[56] References Cited

U.S. PATENT DOCUMENTS

| | | | |
|---|---|---|---|
| 4,083,254 | 4/1978 | Nissl | 73/517 R |
| 4,322,979 | 4/1982 | Fromm | 73/705 |
| 4,490,618 | 12/1984 | Cielo | 250/571 |
| 4,681,451 | 7/1987 | Guerra et al. | 356/373 |
| 4,865,453 | 9/1989 | Gidon et al. | 385/14 |
| 4,891,584 | 1/1990 | Kamieniecki et al. | 324/158 R |
| 4,941,753 | 7/1990 | Wickramasinghe | 374/120 |
| 4,992,728 | 2/1991 | McCord et al. | 324/158 P |
| 5,018,865 | 5/1991 | Ferrell et al. | 356/376 |
| 5,028,132 | 7/1991 | Hickel et al. | 356/376 |
| 5,065,103 | 11/1991 | Slinkman et al. | 324/458 |
| 5,125,740 | 6/1992 | Sato et al. | 356/128 |

FOREIGN PATENT DOCUMENTS

| | | | |
|---|---|---|---|
| 58-000602 | 1/1983 | Japan | 356/373 |
| 63-111403 | 5/1988 | Japan | 356/373 |
| 63-255606 | 10/1988 | Japan | |
| 63-263401 | 10/1988 | Japan | |
| 2-205046 | 8/1990 | Japan | |
| 9004753 | 5/1990 | PCT Int'l Appl. | |

OTHER PUBLICATIONS

Emil Kamineniecki, J. Appl. Phis. vol. 54, No. 11, pp. 6481-6487, Nov. 1983 Model SCA-H Surface Charge Analyzer Brochure by Semi-Test.

Primary Examiner—David C. Nelms
Assistant Examiner—K. Shami
Attorney, Agent, or Firm—Ostrolenk, Faber, Gerb & Soffen

[57] ABSTRACT

The invention provides a device which utilizes the tunnel effect occuring upon a condition of geometric total reflection, for measuring a narrow gap and surface unevenness of a specimen with high precision. An optical device 40 includes a semi-conductor laser 42, a photodiode 43, and a waveguide layer 44 is formed on a semi-conductor substrate 41 by epitaxial growth. A reflecting surface 44b of the waveguide layer 44 is parallel to the plane of the semi-conductor substrate. A laser beam emitted from the semi-conductor laser is reflected from the reflecting surface 44b under a condition of total reflection in geometrical optics. When the gap between the reflecting surface and the specimen is less than or equal to about the wavelength of the laser beam, part of the laser beam is transmitted into the specimen. The intensity of the transmitted light, which is calculated corresponding to the intensity of the reflected light, depends on the dimension of the gap. In the practice of the invention, the relationship between the transmittance and the dimension of the gap is previously obtained, and the dimension of the gap is determined corresponding to the transmittance measured. A narrow gap and the surface unevenness are accurately and precisely measured.

14 Claims, 24 Drawing Sheets n1 = 1.5103    k1 = 0.0 (BK7)

n2 = 1.0       k2 = 0.0 (AIR)

n3 = 3.673     k3 = 0.005 (SILICON)

λ = 0.827 μm (GaAℓAs LASER)

θ1 = 45°

$n1 = 1.5103 \quad k1 = 0.0 \text{ (BK7)}$ $n2 = 1.0 \quad k2 = 0.0 \text{ (AIR)}$ $n3 = 3.673 \quad k3 = 0.005 \text{ (SILICON)}$ $\lambda = 0.827 \mu m \text{ (GaAℓAs LASER)}$ $\theta1 = 45°$

OPTICAL GAP MEASURING DEVICE USING FRUSTRATED INTERNAL REFLECTION

CROSS REFERENCE TO RELATED APPLICATION

This application is a Continuation-In-Part of copending U.S. application Ser. No. 07/707,152 filed on May 29, 1991.

BACKGROUND OF THE INVENTION

1. Field of the Invention

The present invention relates to a gap measuring device and a method of manufacturing the same for measuring a narrow gap utilizing the tunnel effect of light waves reflected upon boundary plane on the condition of total reflection.

2. Description of the Prior Art

High-precision laser range finders such as Michelson interferometers are used for precise measurement of distances by utilizing the interference of laser beams. The high-precision laser range finders determine a distance based upon the principle that the number of interference fringes formed due to the interference of laser beams is directly proportional to a displacement of a movable mirror (or a rectangular prism).

High-precision laser range finders are, however, not suitable for measuring a gap between a mask and a wafer or for measuring unevenness of the wafer in the printing process, i.e., in printing a mask pattern onto the wafer in semiconductor manufacture. The high-precision laser range finders require movement of the movable mirror in response to the dimension of the gap between the mask and the wafer or to the degree of the wafer unevenness; this is, however, impossible when the dimension of the gap or the wafer unevenness is unknown.

Thus, there is no satisfactory apparatus for precisely measuring a narrow gap or the unevenness of a surface.

SUMMARY OF THE INVENTION

An object of the present invention is to provide a gap measuring device and a method of manufacturing the same for precisely measuring a narrow gap or the unevenness of a surface.

The present invention is directed to a device for measuring a gap between a surface of a specimen and a specific member comprising: a substrate; a laser source mounted on the substrate, for emitting a laser beam; an optical waveguide, having a reflecting surface comprising the specific member, for reflecting the laser beam at the reflecting surface such that geometric optical total reflection occurs; and a photosensor mounted on the substrate, for measuring intensity of the laser beam reflected by the reflecting surface.

In the preferred embodiment, the substrate and the optical waveguide constitute a unitary member transmitting light.

Preferably, the laser source and the photosensor are fixed on the substrate with adhesive.

According to an aspect of the present invention, the substrate is a semi-conductor substrate; the laser source and the photosensor are semi-conductor elements formed on the semi-conductor substrate; and the reflecting surface of the optical waveguide is parallel to a cleavage plane of the semi-conductor substrate.

In the preferred embodiment, the optical waveguide is made of semi-conductor material; and the photosensor is a photo diode of a Shottky barrier type formed in a part of the optical waveguide.

Preferably, each of the substrate, the laser source, and the photosensor is made of semi-conductor material including gallium and arsenic and the optical waveguide is made of semi-conductor material including gallium, aluminum and arsenic.

Moreover, the laser source comprises a resonator utilizing the Bragg reflection of light wave.

In another embodiment, the optical waveguide comprises a diffraction grating for deflecting the laser beam to be incident on the reflecting surface, such that geometric optical total reflection occurs.

The present invention is also directed to a method of manufacturing a device for measuring a gap between a surface of a specimen and a specific member, comprising the steps of: (a) preparing a translucent plate having a main surface and a side surface perpendicular to the main surface; (b) shaping a first opening and a second opening in the main surface of the translucent plate, the first opening having a first wall inclined a predetermined first angle against the side surface of the translucent plate and substantially perpendicular to the main surface of the translucent plate, the second opening having a second wall inclined a predetermined second angle against the side surface of the translucent plate and substantially perpendicular to the main surface of the translucent plate; (c) fixing a laser source in the first opening for emitting a laser beam to pass through the first wall of the first opening to be reflected at the side surface of the translucent plate on condition of geometric optical total reflection; and (d) fixing a photosensor in the second opening for receiving the laser beam reflected at the side surface and passing through the second wall of the second opening.

The present invention is further directed to a method of manufacturing a device for measuring a gap between a surface of a specimen and a specific member, comprising the steps of: (a) preparing a semi-conductor substrate; (b) forming an optical waveguide layer on a main surface of the semi-conductor substrate by epitaxial growth; (c) forming a laser source on the semi-conductor substrate for emitting a laser beam to be introduced into the optical waveguide layer; (d) forming a photosensor in a part of the optical waveguide layer for receiving the laser beam; and (e) shaping side surfaces of the semi-conductor substrate and the optical waveguide layer to make a flat plane perpendicular to the main surface of the semi-conductor substrate such that the laser beam output from the laser source is reflected at the flat plane upon a condition of geometric optical total reflection and received by the photosensor.

The present invention is still further directed to a method of manufacturing a device for measuring a gap between a surface of a specimen and a specific member, comprising the steps of: (a) preparing a semi-conductor substrate; (b) forming an optical waveguide layer on a main surface of the semi-conductor substrate; (c) forming a laser source on the substrate; (d) forming a photosensor on the substrate; (e) forming a first grating on a surface of the optical waveguide layer for deflecting a laser beam, and forming side surfaces of the semi-conductor substrate and the optical waveguide layer to make a flat plane perpendicular to the main surface of the semi-conductor substrate, whereby a laser beam output from the laser source is deflected by the first grating and reflected at the flat plane upon a condition of geometric optical total reflection and received by the photosensor.

Preferably, the step (e) includes a step of making the flat plane parallel to a cleavage plane of the semi-conductor substrate.

Further, the step (c) comprises the steps of: (c-1) forming a semi-conductor layer; and (c-2) forming a second grating on the semi-conductor layer with holographic exposure, the second grating functioning as a resonator of the laser source utilizing Bragg reflection of light wave.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Tunnel Effect

The tunnel effect of a light wave upon a condition of the total reflection will first be explained below. Then the gap measuring apparatus and surface unevenness detecting apparatus embodying the present invention will be explained.

The tunnel effect is generally observed as physical phenomena expressed by a wave function, including the reflection of light. More specifically, when boundary conditions are provided on the boundary plane of a medium, the wave function exponentially damps outside the boundary plane. This means that the wave oozes or tunnels from the boundary plane as far as its wavelength.

When light is incident on an optically thin medium, e.g., air, from an optically dense medium e.g., glass, at an incident angle greater than its critical angle, total reflection in terms of geometrical optics is observed. When the propagation of light (or electric field) is expressed by a wave function, the wave function representing the light (or the electric field) is transmitted into the optically thin medium (or the air) in spite of the total reflection condition in terms of geometrical optics.

Figure 2:
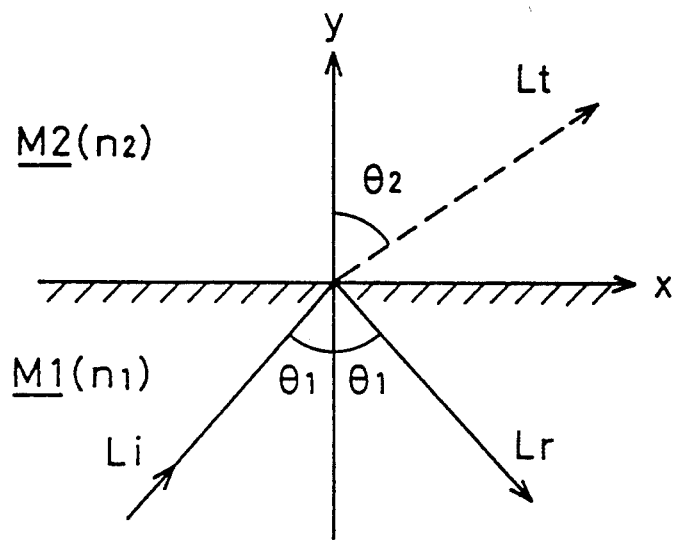
FIG. 2 is a diagram showing an optical path of light transmitted into a double layer structure.

FIG. 2 is a diagram showing an optical path of light transmitted from an optically dense medium M1 to an optically thin medium M2. Incident light Li is linearly polarized light having a polarization direction in the x-y plane. In other words, its electrostatic vector is parallel to the x-y plane. The incident light Li is incident on a boundary between the media M1 and M2 at an incident angle $\theta 1$. Refractive indices of the medium M1 and the medium M2 are n1 and n2, respectively. FIG. 2 shows light Lt oozing into the medium M2 at an angle $\theta 2$ as well as reflected light Lr although this figure satisfies the total reflection condition in terms of geometrical optics. The electric field Et of the through-light Lt, is expressed by the following wave function:

$$Et = E0 * \exp(-kt*\alpha*y) \exp[i*\{kt(n1/n2)\sin\theta 1 * x - \omega * t\}] \quad (1)$$

where E0 is a constant; kt and $\alpha$ are constants expressed by the following equations (2) and (3), respectively; $\omega$ represents angular frequency of the light; and the operator "*" denotes multiplication.

$$Kt = n2 * (2*\pi)/\lambda \quad (2)$$

$$\alpha = [(n1/n2)^2 * (\sin\theta 1)^2 - 1]^{0.5} \quad (3)$$

where $\lambda$ denotes a wavelength of the light.

In equation (1), the term $\exp(-kt*\alpha*y)$ shows that the electric field of the light wave is transmitted into the medium M2 and the amplitude of the electric field $|Et|$ exponentially and monotonously decreases in a distance as far as the wavelength $\lambda$.

Equations used here are equivalent to the equations shown in Fineman, Rayton, and Sanz, "Fineman Physics", Vol. IV, Electromagnetic Wave and Properties (Japanese version); Iwanami, March, 1986; page 196, line 20.

If the medium M2 is air, n2 is equal to 1.0 and the equations (1) through (3) are rewritten as the following equations (1a) through (3a):

$$Et = E0 * \exp(-kt*\alpha*y) \exp[i*(kt*n1*\sin\theta 1*x - \omega*t)] \quad (1a)$$

$$kt = (2\pi)/\lambda \quad (2a)$$

$$\alpha = [(n1*\sin\theta 1)^2 - 1]^{0.5} \quad (3a)$$

Figure 3:
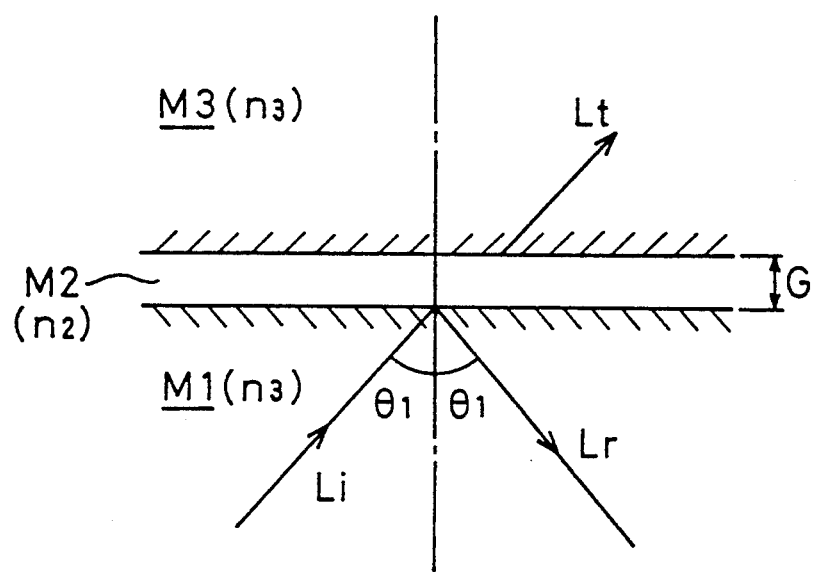
FIG. 3 is a diagram showing an optical path of light transmitted into a triple layer structure.

Suppose that, from the state of FIG. 2, another optically dense medium M3 approaches in the air M2 down to the medium M1, as shown in FIG. 3. When a gap G between the medium M1 and the third medium M3 decreases to be approximately equal to the wavelength λ, dipole moment of the third medium M3 is excited and the light wave begins to be transmitted into the third medium M3. The electric field of the light Lt transmitted into the third medium M3 is approximated by the equations (1a) through (3a) stated above. Here the intensity of the transmitted light Lt is known to be proportional to the square of the amplitude |Et| of the electric field.

The gap G can be found from the relationship between the intensity of the transmitted light Lt and the gap G according to the equations (1a) through (3a); namely, the gap G can be measured by calculating in advance the relation between the intensity of the transmitted light Lt and the gap G, and by substituting the observed intensity of the transmitted light Lt in the relation. For more precise calculation of the electric field Et of the transmitted light Lt, Maxwell's equations instead of the equations (1a) through (3a), will be required to be solved on the boundary conditions for the three layer structure consisting of the three media M1, M2, and M3. The calculation can be executed with a computer. A computer program applicable to the calculation is, for example, shown in Tohru Kusakawa, "Lens Optics", Tokai University Press, 1988, pages 295-310.

Practically, the intensity of the reflected light Lr is measured instead of the intensity of the light Lt transmitted into the optically dense medium M3 on account of the difficulty in the measurement of the latter. The relation among the intensities Pi, Pr, and Pt of the incident light Li, the reflected light Lr, and the transmitted light Lt, respectively, is expressed as follows:

$$Pt/Pi = 1 - Pr/Pi \quad (4)$$

Table 1 shows the reflectance Rr (=Pr/Pi) of the reflected light Lr given by the precise calculation of the electric field of the light wave propagated through the three layer structure. Results in Table 1 are for s-polarized light, p-polarized light and linearly polarized light having a polarization direction at an angle of 45 degrees to each of s- and p-polarized light (hereinafter referred to as s+p polarized light).

TABLE 1

| Gap | Reflectance Rr (=Pr/Pi) | | |
|---|---|---|---|
| G (μm) | s-polarized | p-polarized | s + p polarized |
| 0.0 | 0.285 | 0.081 | 0.183 |
| 0.1 | 0.508 | 0.152 | 0.330 |
| 0.2 | 0.758 | 0.325 | 0.542 |
| 0.3 | 0.881 | 0.524 | 0.702 |
| 0.4 | 0.939 | 0.691 | 0.815 |
| 0.5 | 0.967 | 0.810 | 0.889 |
| 0.6 | 0.982 | 0.887 | 0.935 |
| 0.7 | 0.990 | 0.934 | 0.962 |
| 0.8 | 0.994 | 0.962 | 0.978 |
| 0.9 | 0.997 | 0.979 | 0.988 |
| 1.0 | 0.998 | 0.988 | 0.993 |

Conditions for Table 1 are as follows:

n1 = 1.5103,      k1 = 0.0 (borosilicate glass, BK7)
n2 = 1.0,         k2 = 0.0 (air)
n3 = 3.673,       k3 = 0.005 (silicon)
λ = 0.827 μm (GaAlAs laser)
θ1 = 45 degrees where k1, k2, and k3 denote extinction coefficients of the media M1 (BK7), M2 (air), and M3 (silicon), respectively.

Any linearly polarized light can be separated into an s-polarized light component and a p-polarized light component. When the polarization direction of a linearly polarized light deviates at an angle of θ to that of the s-polarized light, the reflectance Rra of the linearly polarized light is a function of the reflectance Rrs of the s-polarized light and the reflectance Rrp of the p-polarized light is given below as:

$$Rra = \cos^2\theta * Rrs + \sin^2\theta * Rrp \quad (5)$$

Figure 4A:
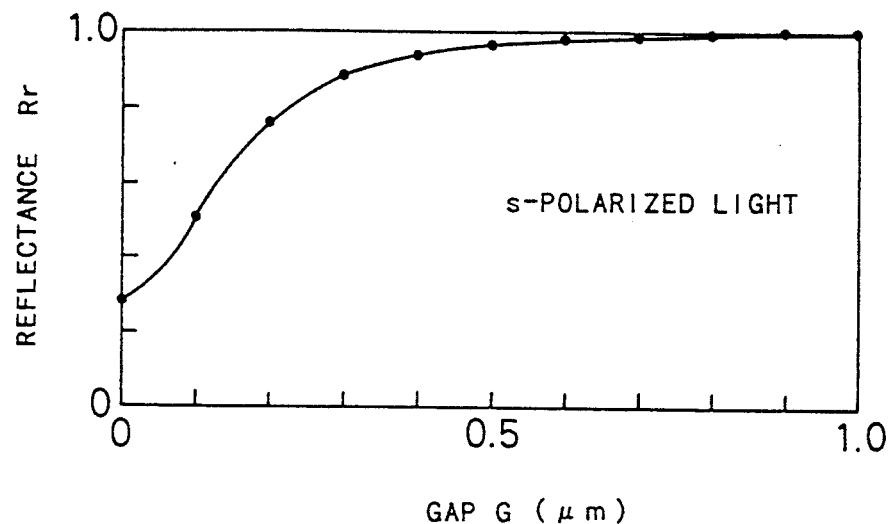
FIGS. 4A through 4C are graphs showing the reflectance plotted against the dimension of a gap.
Figure 4B:
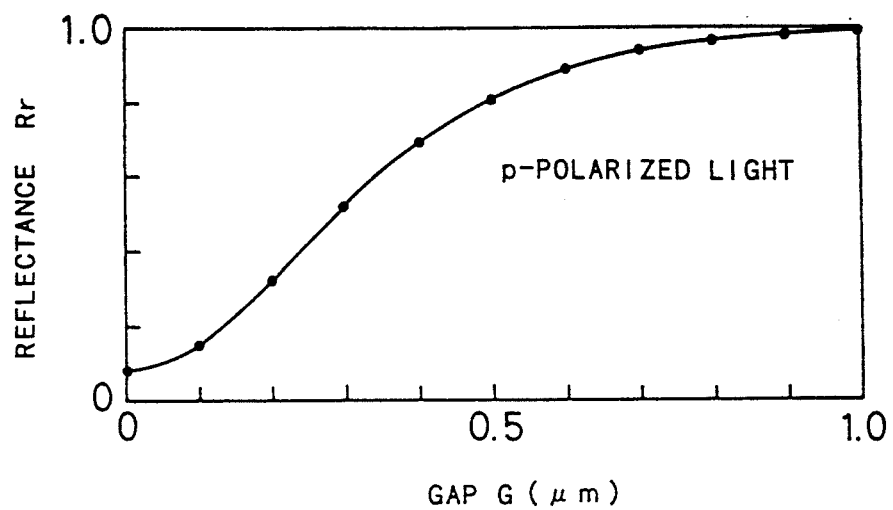
Figure 4C:
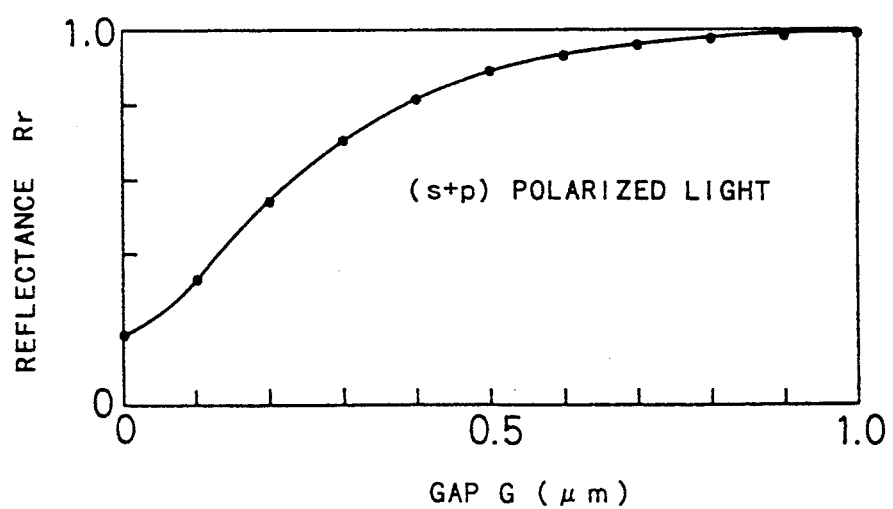

FIGS. 4A through 4C are graphs showing the relations in Table 1. In these graphs, the abscissa is the gap G and the ordinate is the reflectance Rr. When the gap G is far larger than the wavelength λ, the reflectance Rr is approximately 100%, which means total reflection. When the gap G is equal to zero, on the other hand, the reflectance Rr is close to zero, which means that almost all of light is transmitted.

Figure 5A:
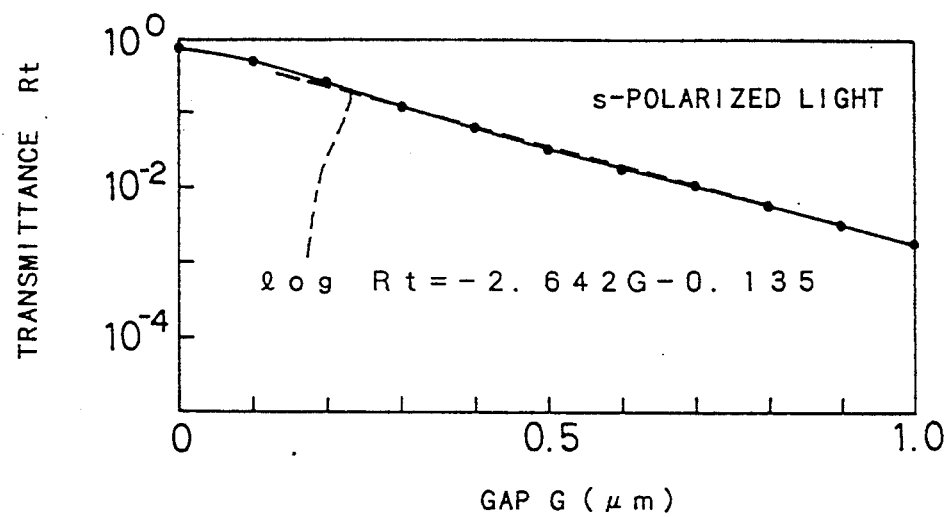
FIGS. 5A through 5C are graphs showing the transmittance plotted against the dimension of a gap.
Figure 5B:
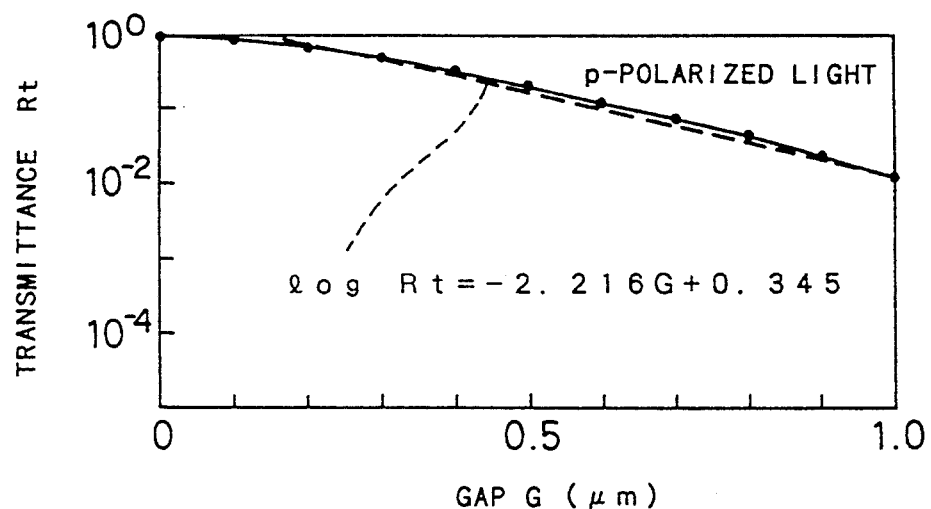
Figure 5C:
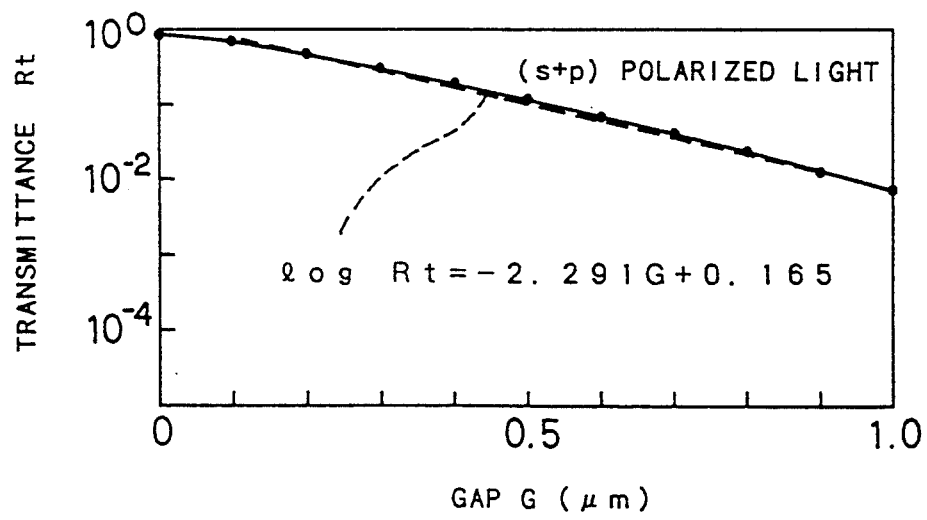
Figure 6A:
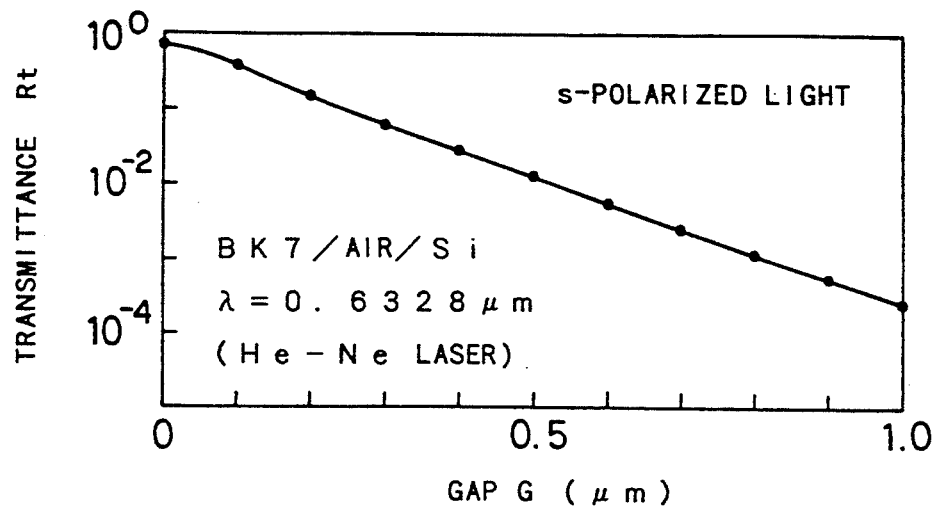
FIGS. 6A through 10B are graphs showing the transmittance plotted against the dimension of a gap under various conditions.
Figure 6B:
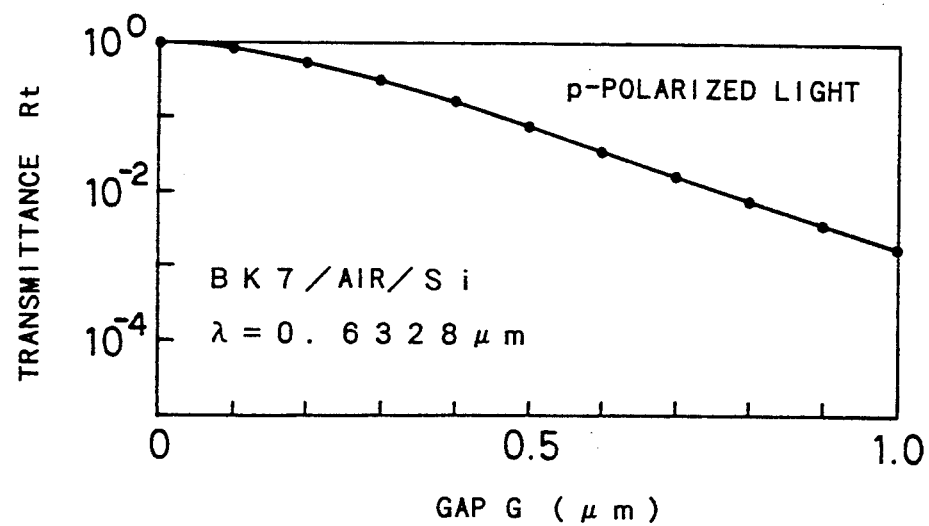
Figure 7A:
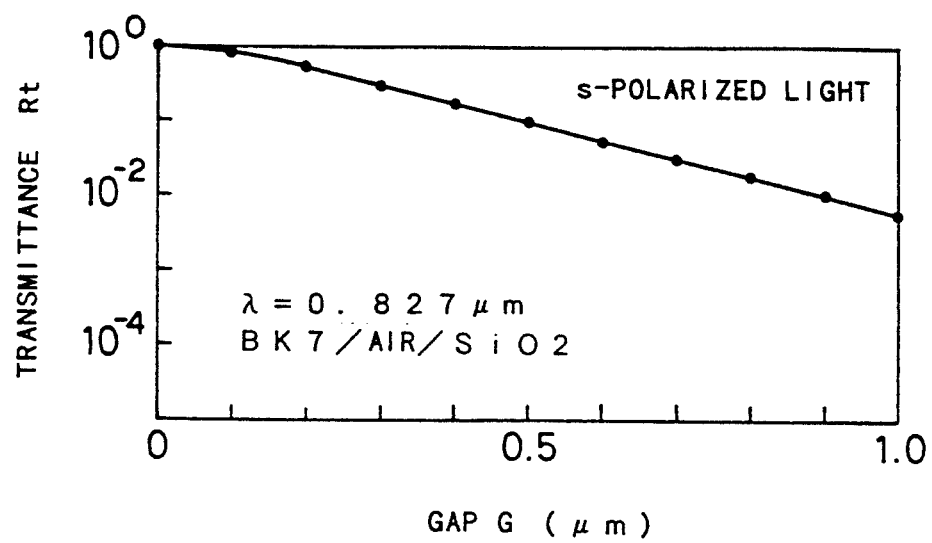
Figure 7B:
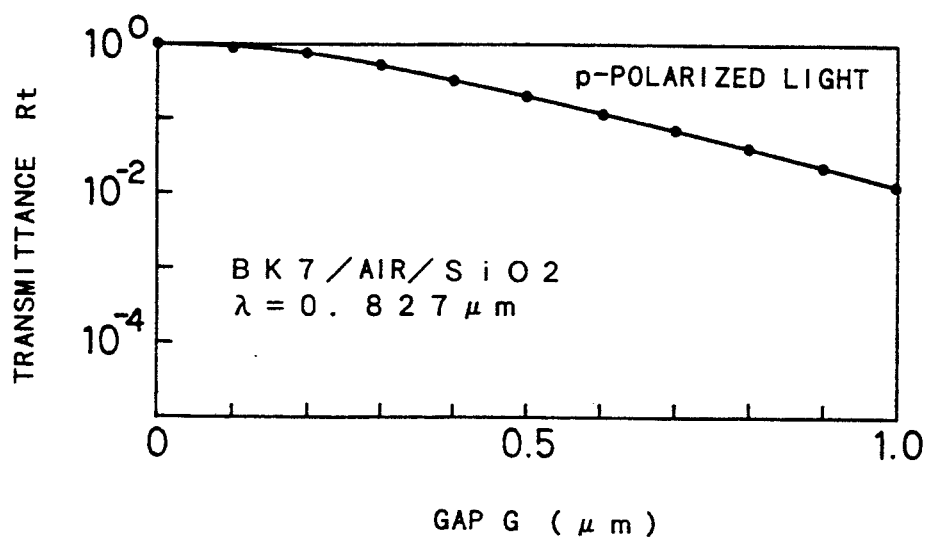
Figure 8A:
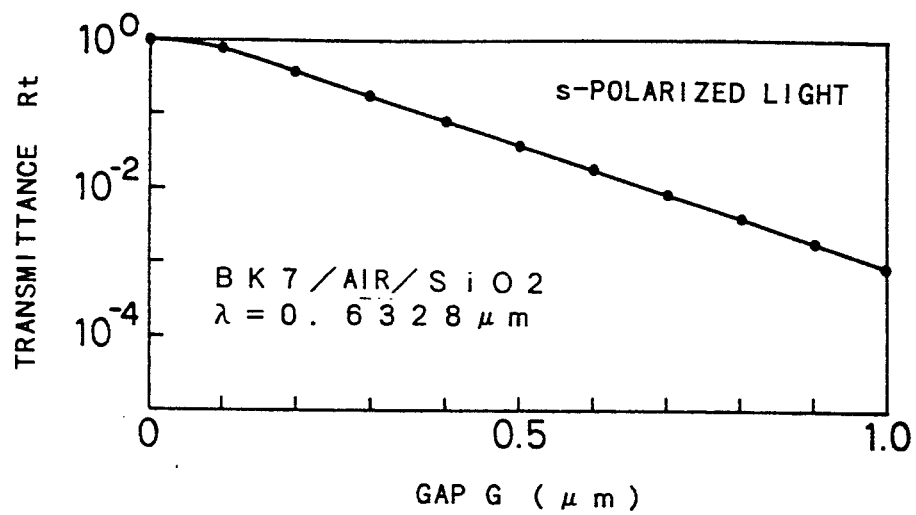
Figure 8B:
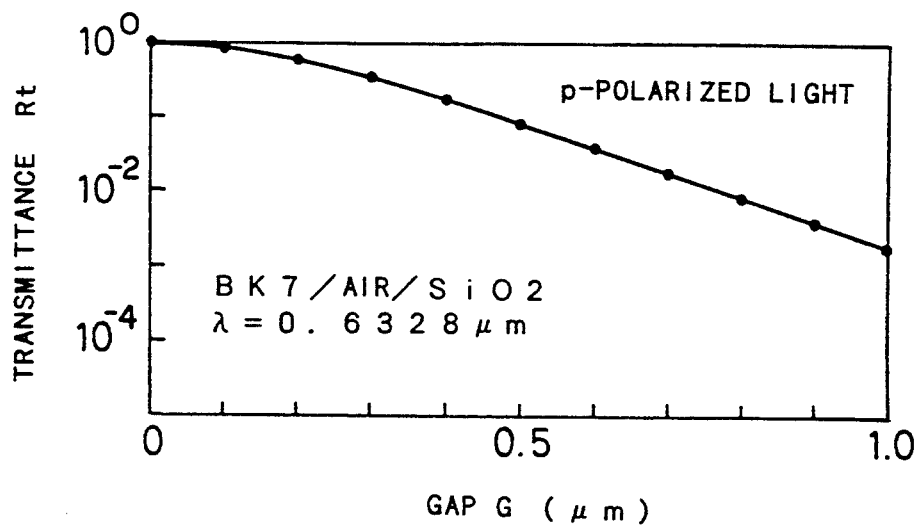
Figure 9A:
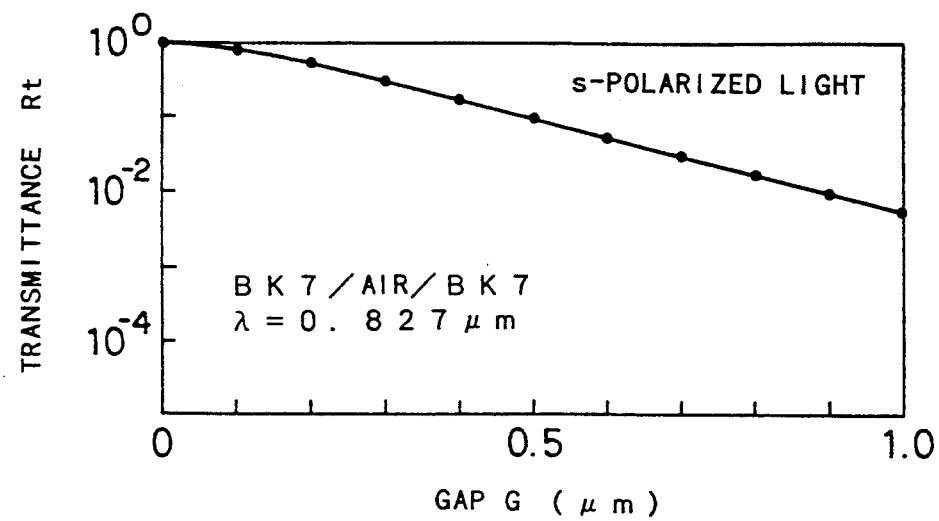
Figure 9B:
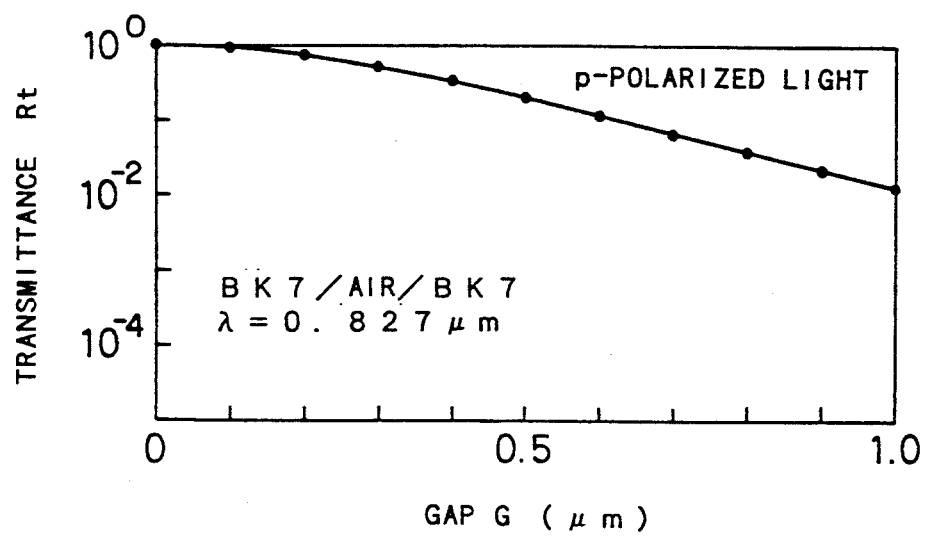
Figure 10A:
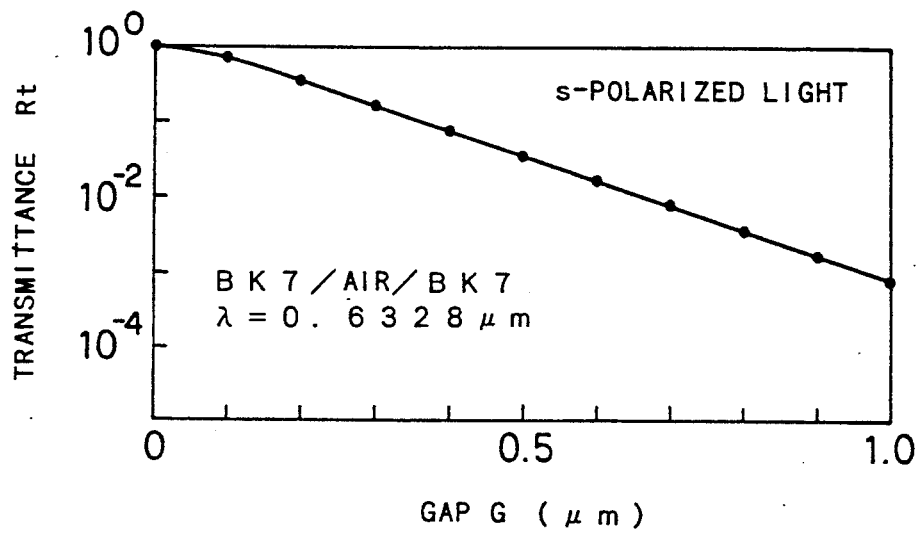
Figure 10B:
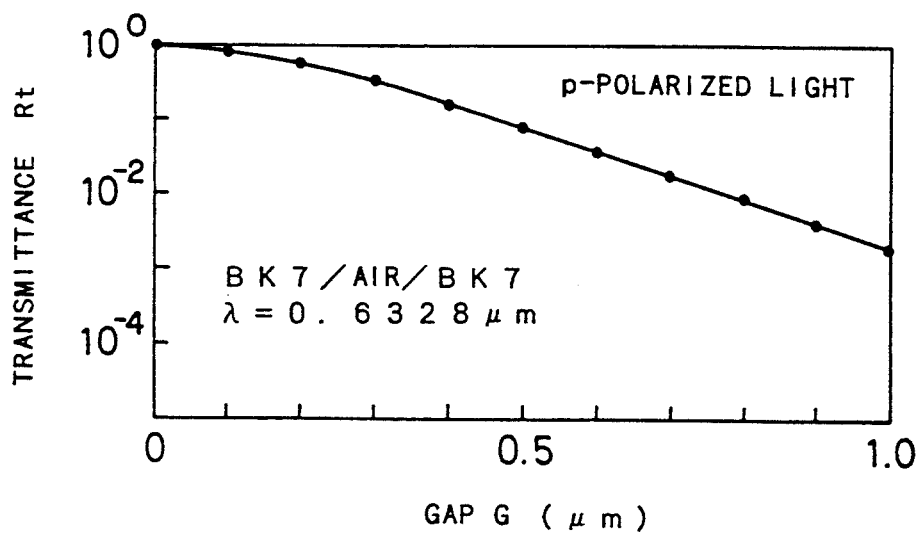

As equation (4) clearly shows, the transmittance Rt (=Pt/Pi) is equal to (1−Rr). FIGS. 5A through 5C are graphs showing the transmittance Rt plotted against the gap G. The ordinate scale for the transmittance Rt is logarithmic. The transmittance curve log(Rt) can be approximated by a straight line except for a range of the gap G near zero. Broken lines in FIGS. 5A through 5C show approximations in the range of the gap G between 0.2 and 1.0 μm and are respectively expressed as follows:

$$\log Rt = -2.042G - 0.135 \quad (6a)$$

$$\log Rt = -2.216G - 0.345 \quad (6b)$$

$$\log Rt = -2.291G - 0.165 \quad (6c)$$

FIGS. 6A, 6B through FIGS. 10A, 10B show the transmittance Rt plotted against the gap G for various wavelengths of the laser beam and for various materials of the third specimen M3. The constituents of each test piece are shown in the manner of medium M1/medium M2/medium M3. The transmittance of (s+p) polarized light is omitted since it can be calculated from those of s-polarized light and p-polarized light. The transmittance curve log(Rt) plotted against the gap G is approximated by a straight line irrespective of the wavelength of the laser beam and the third medium M3.

As described above, the value of the gap G is determined by substituting the observed reflectance in that relation between the reflectance or transmittance and the gap G, which is calculated in advance.

B. First Embodiment

Figure 1:
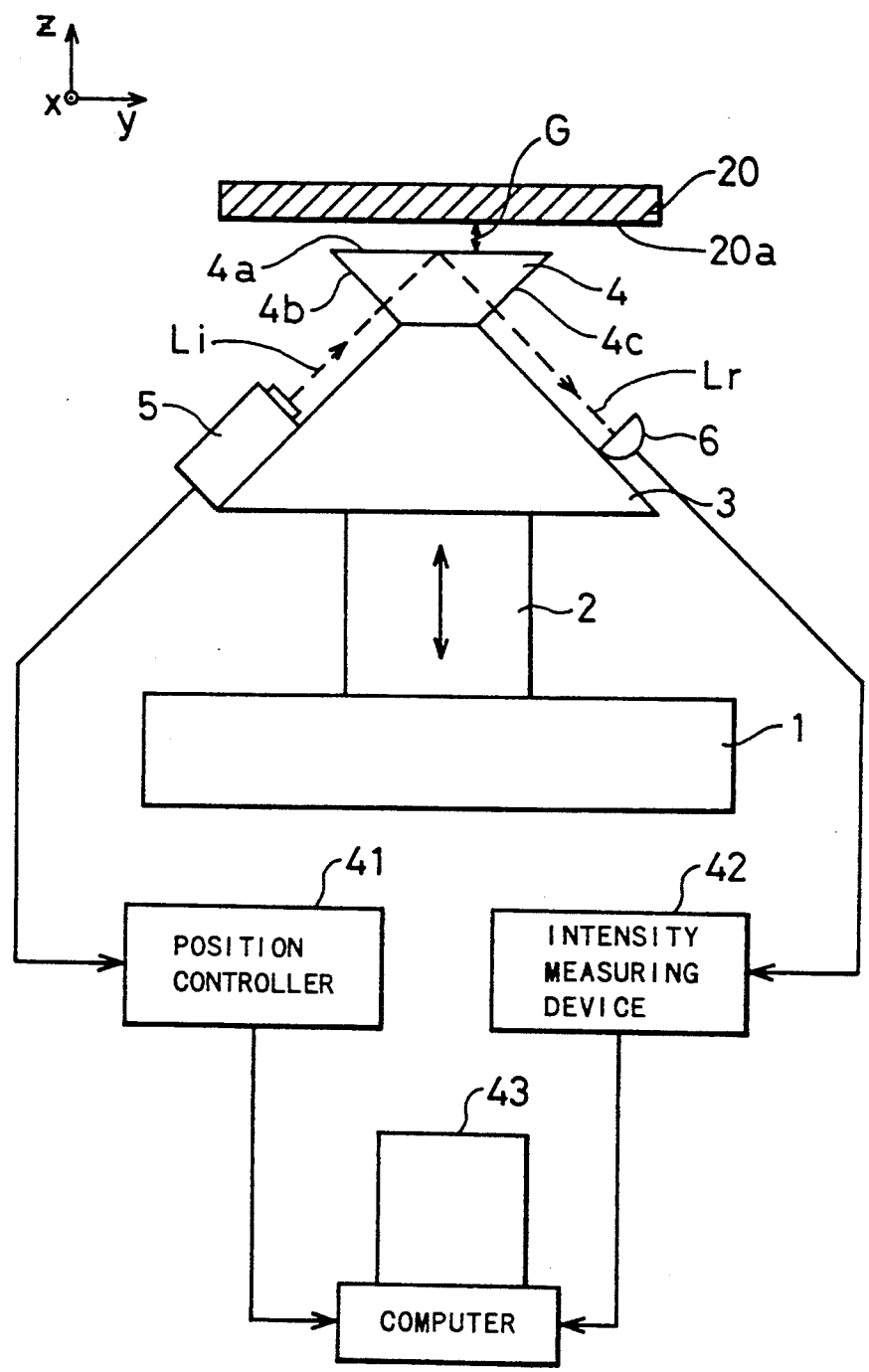
FIG. 1 is a schematic view illustrating the structure of a gap-measuring apparatus embodying the present invention.

FIG. 1 is a schematic view illustrating the structure of a gap-measuring apparatus embodying the present invention. The gap-measuring apparatus has a base 1, a piezoelectric actuator 2 attached to the base and a trapezoid stand 3 further mounted on the piezoelectric actuator 2. The two slanted faces of the stand 3 are formed perpendicular to each other. A prism 4 is provided on the top of the stand 3. A laser source 5, e.g., GaAlAs laser, and a photosensor 6, e.g., a photo diode, are fixed on opposite ends of the slanted faces of the stand 3, respectively.

The gap measuring apparatus further comprises a position controller 41, an intensity measuring device 42, and a computer 43. The position controller 41 is connected to the piezoelectric actuator 2 and drives the same. The intensity measuring device 42 is connected to the photosensor 6 and determines the intensity of light received by the photosensor 6. The computer 43 receives outputs from the position controller 41 and the intensity measuring device 42 and determines the value of the gap G as will be described later in detail.

The prism 4 is made of borosilicate glass (BK7) and its top surface 4a is held in parallel to the surface of an x-y table (not shown) on which a specimen or test piece is fixed. The prism 4 is a rectangular prism having an incident surface 4b and an exit surface 4c perpendicular to each other. The surfaces 4b and 4c are inclined at an angle of 45 degrees to the top surface 4a. A specimen 20 is held above the prism 4 across a gap G with a holding mechanism (not shown) and has a lower face 20a approximately parallel to the top surface 4a of the prism 4.

The piezoelectric actuator 2 has a piezoelectric element extensible and contractible in the z direction. The stand 3 is movable in the z direction by controlling the voltage applied to the piezoelectric element.

A laser beam Li emitted from the laser source 5 enters the incident surface 4b of the prism 4 at an incident angle of 90 degrees and then on the top surface 4a at an incident angle of 45 degrees. Since the critical angle of incidence is 41.5 degrees under the conditions shown in Table 1, the total reflection conditions in terms of the geometrical optics are satisfied. A reflected light beam Lr perpendicularly exiting through the exit surface 4c is detected by the photosensor 6.

The gap G is measured as follows: First the gap G is maintained to be several times as long as the wavelength $\lambda$ of the laser beam. The laser, beam Li is then emitted and reflected by the prism 4, The photosensor 6 detects the intensity of the reflected light Lr. The laser beam Li is not transmitted through the gap which is several times the wavelength $\lambda$, but is totally reflected at the top surface 4a of the prism 4. The intensity of the reflected light Lr detected by the photosensor 6 represents the intensity Pi of the incident light Li accordingly. The stand 3 is then moved upward in the z direction by the piezoelectric actuator 2, whereby the gap G is decreased to be nearly equal to the wavelength $\lambda$.

The laser beam Li is again emitted and the intensity Pr of the reflected light Lr is detected by the photosensor 6. Part of the laser beam Li is transmitted into the specimen 20 at this time. The ratio of the intensity Pr of the reflected light Lr in this measurement to the intensity Pi of the incident light Li in the former measurement represents the reflectance Rr. The transmittance Rt (=1 Rr) is also obtained by calculation. For example, when the specimen 20 is made of silicon and the incident light Li is s-polarized light, the gap G responsive to the transmittance Rt can be found from FIG. 5A.

The gap G can be found from a look-up table representing, for example, the relation shown in FIG. 5A. The value of the gap G may be calculated by interpolation, if necessary. Alternatively the gap G can be found in response to the transmittance Rt according to the equation (6a) The relationship between the transmittance Rt or the reflectance Rr and the gap G can be also expressed by various functions other than a linear function like equation (6a), e.g., high order, logarithmic, and exponential functions.

C. Second Embodiment

Figure 11:
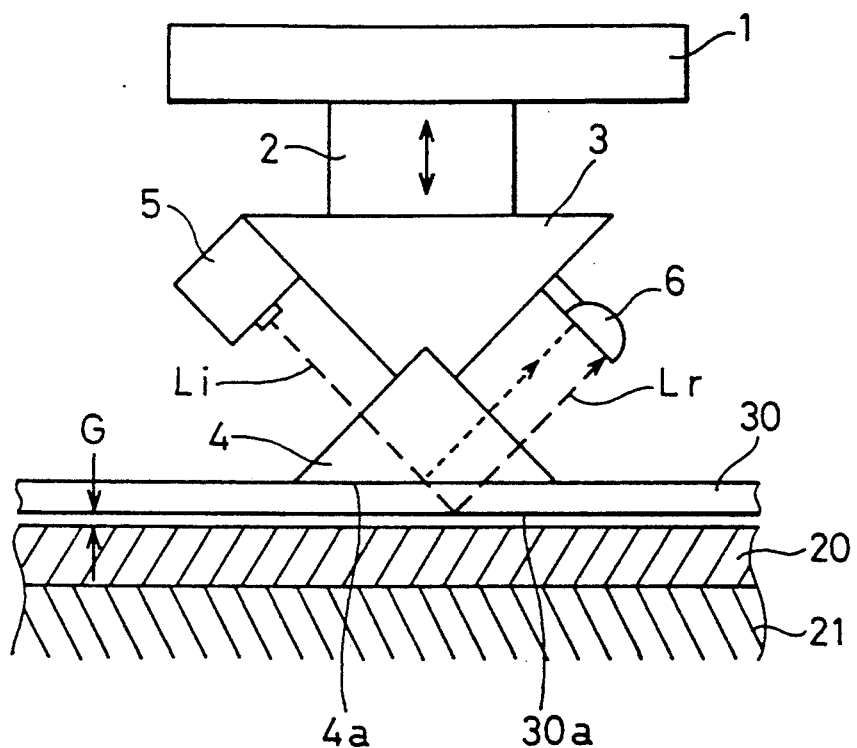
FIG. 11 is a schematic view illustrating a gap-measuring apparatus according to the present invention.

FIG. 11 is a schematic view of a proximity gap measuring apparatus according to the present invention. Proximity exposure is a method of printing a mask pattern onto flat panels of liquid crystal or on silicon wafers for semiconductor devices.

The apparatus, for example, measures a narrow gap between a photo resist applied on a silicon wafer and a photo mask in proximity exposure. The proximity gap measuring apparatus includes a base 1, a piezoelectric actuator 2, a stand 3, a prism 4, a laser source 5, and a photosensor 6, as is the case with the gap-measuring apparatus of FIG. 1. These elements are oriented upside-down to those of the apparatus shown in FIG. 1. A bottom surface 4a is in contact with a photo mask 30. The photo mask 30 is positioned above a photo resist 20 applied on a silicon wafer 21 across a gap G of about 1 $\mu$m, and is approximately in parallel with the upper surface of the photo resist 20.

The photo mask 30 is mainly composed of glass. As shown in FIG. 11, practically all of the laser beam Li emitted from the laser source 5 is transmitted through the bottom surface 4a of the prism 4 and reflected at a bottom surface 30a of the photo mask 30. The reflected light Lr then follows an, optical path shown by a broken line instead of the path shown by a dotted line. The photosensor 6 has a specific receiving surface to ensure that it receives all of the reflected light Lr even when the optical path of the reflected light Lr is changed as stated above.

In the above situation, the prism 4 and the photo mask 30 as a whole act as a reflector. The photo mask 30 may be detached from the prism after measurement of the gap G.

The procedure for measuring the gap G is as follows: First, optical constants, i.e., refractive index and extinction coefficient, of the photo resist 20 applied on the silicon wafer 21 are measured by ellipsometry. At this stage, the photo mask 30 is distanced from the photo resist 20 by more than several times the wavelength $\lambda$ of the laser beam. The intensity of the reflected light Lr, which is equal to that of incident light Li, is measured in this condition. Then the photo mask 30 is moved in proximity to the photo resist 20 in such a position as shown in FIG. 11, and the intensity of the reflected light Lr is measured. The dimension of the gap G is found based on the intensity of the incident light Li and that of the reflected light Lr.

The measurement of the absolute value of the gap G is not essential for repeatability of the proximity exposure as long as the gap G is controlled to have a desired constant value on every exposure. In order to achieve the constant gap G on every exposure, a distance between the photo mask 30 and the photo resist 20 is adjusted to attain a constant reflectance Rr. In this case, the optical constants of the photo resist 20 are not needed.

D. Third Embodiment

Figure 12:
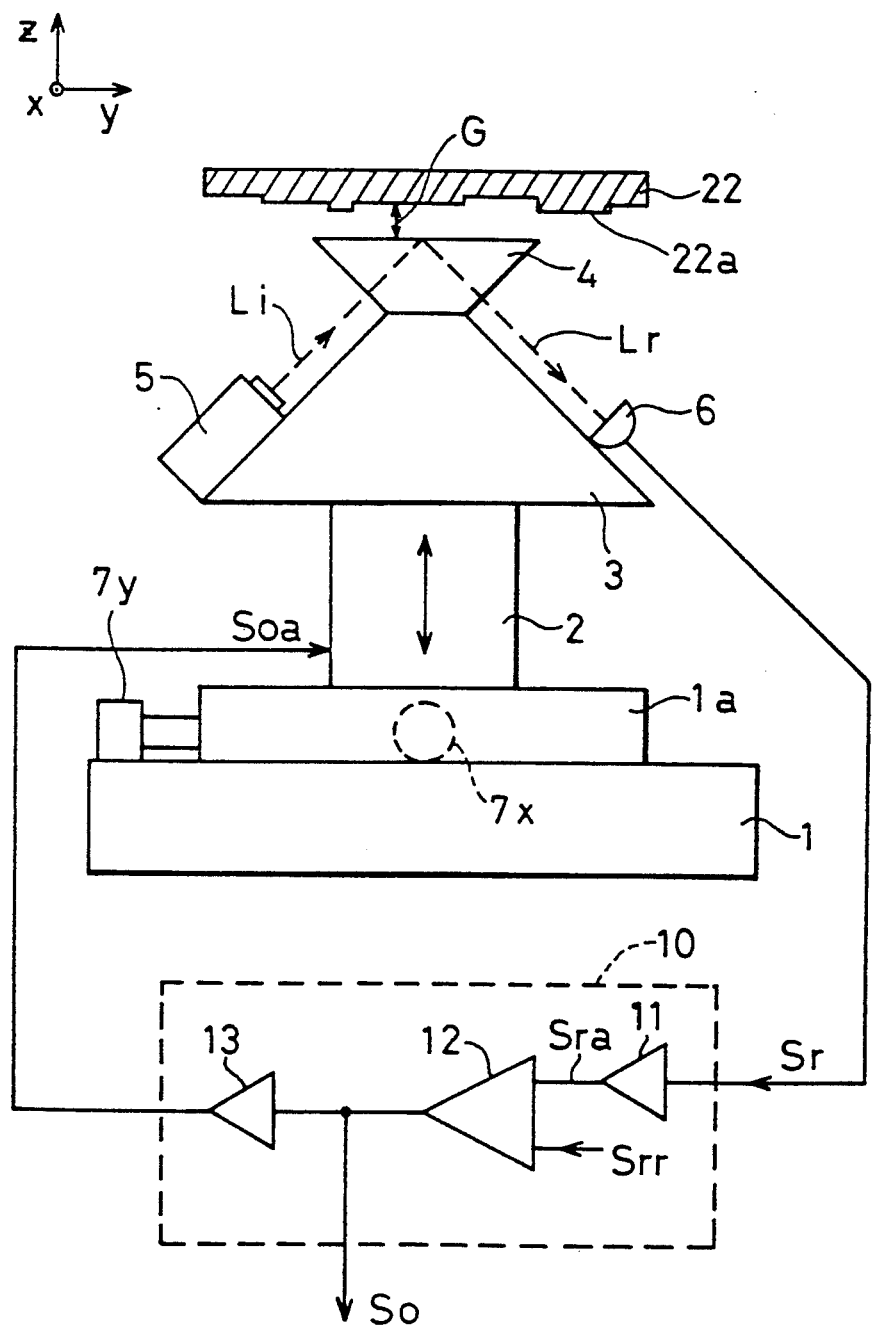
FIG. 12 is a schematic view illustrating a surface condition detecting apparatus.

FIG. 12 is a schematic view illustrating an apparatus for detecting a surface condition, embodying the present invention. The apparatus is efficiently used for measuring unevenness on a surface of a specimen (or a test piece) 22. The surface condition detecting apparatus comprises an actuator 2, a stand 3, a prism 4, a laser source 5, and a photosensor 6, which are all located upon an x-y table 1a mounted on a base 1. The x-y table 1a is positioned in x and y directions with two high-precision ball screws driven by an x-direction driving motor 7x and a y-direction driving motor 7y, respectively. The apparatus further includes a servo amplifier circuit 10 having an amplifier 11, a comparator 12, and another amplifier 13 connected in series.

The unevenness of the surface 22a of the specimen 22 is measured as follows: When the photosensor 6 detects the intensity of the reflected light Lr, a signal Sr proportional to the intensity of the reflected light is supplied from the photosensor 6 to the amplifier 11. The amplifier 11 amplifies the signal Sr and supplies an amplified signal Sra to an input port of the comparator 12, which compares the amplified signal Sra with a reference signal Srr given to another input port of the comparator 12. The reference signal Srr represents a predetermined value of the gap G between the specimen 22 and the prism 4. The comparator 12 has zero-shift function; that is, the comparator 12 outputs a signal S0 whose level is shifted in response to the relation of the levels of the signals Sra and Srr. The output signal So is amplified by the amplifier 13 to become a signal Soa, which is supplied to the piezoelectric actuator 2 for the z direction. The amount of the zero-shift by the comparator 12 increases or decreases in response to the relation of the levels of the signals Sra and Srr until the signals Sra and Srr become equal to each other. The signals So and Soa are shifted until the gap G between the specimen 22 and the prism 4 equals a predetermined constant value and until the signals Sra and Srr become equal to each other. Meanwhile the signal Soa drives the piezoelectric actuator 2 and moves the stand 3 in the z direction. The piezoelectric actuator 2 has a piezoelectric element which extends and contracts by an amount corresponding to the input signal Soa, which is directly proportional to the signal So outputted from the comparator 12. Namely, the extension or contraction of the piezoelectric actuator 2 is in proportion to the signal So. Accordingly, the unevenness on the surface 22a of the specimen 22 can be found by converting the signal So into the amount of extension and contraction of the piezoelectric actuator 2.

The servo amplifying circuit 10 may, be removed from the proximity gap measuring apparatus. In this case, the gap G is measured according to the relationship between the transmittance or the reflectance and the gap G, such as that shown in FIG. 5A, while using the signal Sr outputted from the photosensor 6 as a signal representing the value of the transmittance or the reflectance. In this case, variation of the gap G on the x-y plane is measured by shifting the x-y table 1a with the motors 7x and 7y. The variation of the gap G represents unevenness on the surface 22a of the specimen 22.

Although GaAlAs and He-Ne lasers are preferably used in the above embodiment, they are replaceable with any other appropriate lasers. The wavelength of the laser beam depends upon the type of laser. The preferable size of a gap between the specimen and the prism or photo mask is one tenth to twice as long as the wavelength of the laser beam, or more particularly almost the same as the wavelength, for precise measurement with the gap-measuring apparatus or the surface condition detecting apparatus. A suitable laser source for precise measurement can therefore be chosen according to the dimension of the gap to be measured.

The specimen may be made of any material, such as glass, silicon, silicon oxides, and photo resists. Materials with known optical constants are preferable because the use of those materials makes it easier to find the absolute value of the gap.

The piezoelectric actuator 2 may drive the specimen 20 or 22 instead of the stand 3. Another driving mechanism (or a first driving mechanism) for moving the specimen and the prism in the direction varying the gap may be used in instead of the piezoelectric actuator 2. The piezoelectric actuator is, however, preferable since it controls a distance less than 1 micrometer with high precision. The driving motors 7x and 7y may be replaced by another driving mechanism (or a second driving mechanism) for moving the specimen 22 and the x-y table 1a within a surface perpendicular to the direction varying the gap.

E. Effects of Incident Angle and Polarization Plane Angle

Figure 13:
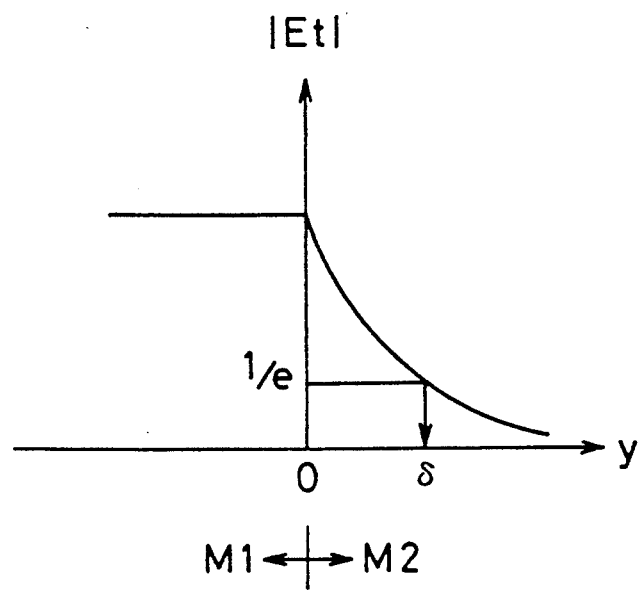
FIG. 13 is a graph showing damping of the electric field from a boundary.

The electric field Et expressed by equation (1) exponentially attenuates from the boundary between the medium M1 and the medium M2 (see FIG. 1 or FIG. 2) as shown in FIG. 13. The dimension of a gap is determined by utilizing the electric field Et extending or tunneling from the boundary between the medium M1 and the medium M2. The field depth $\delta$, which is the distance where the absolute value of the electric field Et is equal to $1/e$, is defined as follows:

$$\delta = 1/(kt^*a) \qquad (7)$$
$$= \lambda/\{2\pi^*n2^*[n1^2/n2^2)^*(\sin\theta1)^2 - 1]^{0.5}\}$$

The equation (7) clearly shows that the field depth $\delta$ depends on the incident angle $\theta1$.

Figure 14:
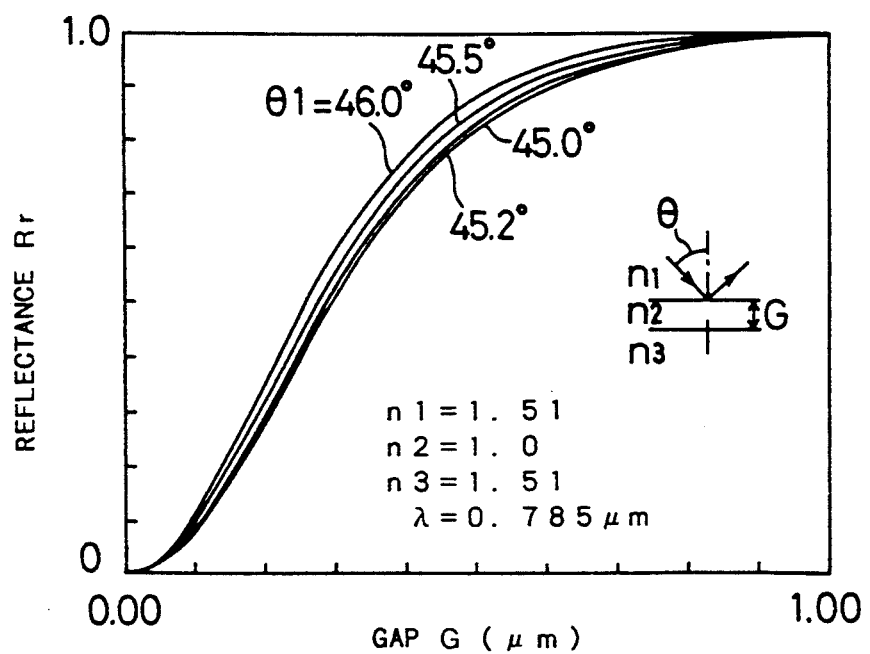
FIG. 14 is a graph showing the relationship between the gap and the reflection factor at certain incident angles.

FIG. 14 is a graph showing the relationship between the gap G and the reflection factor Rr at certain incident angles $\theta1$. The graph demonstrates that the reflection factor Rr is significantly affected by the incident angle $\theta1$.

Figure 15:
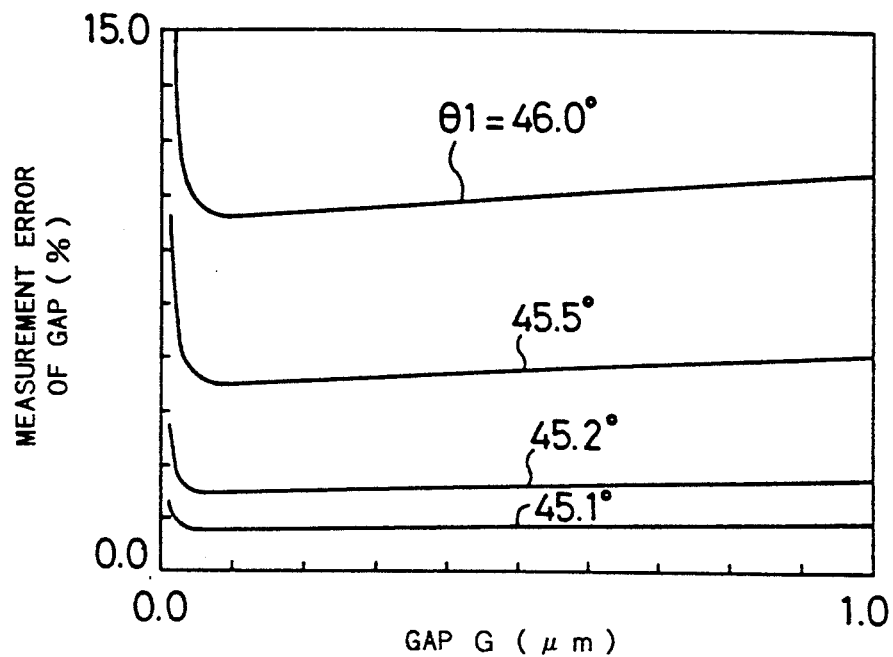
FIG. 15 is a graph showing variation in the measurement error of the gap against the dimension of the gap at certain incident angles.

FIG. 15 is a graph showing the variation in the measurement error of the gap G when the incident angle $\theta1$ is shifted from the standard angle of 45 degrees. For example, the precision of 0.1 degree is required for the incident angle $\theta1$ to make the measurement error in the range between positive and negative one percent. The precision of the incident angle $\theta1$ directly affects the measurement error of the gap G.

Figure 16:
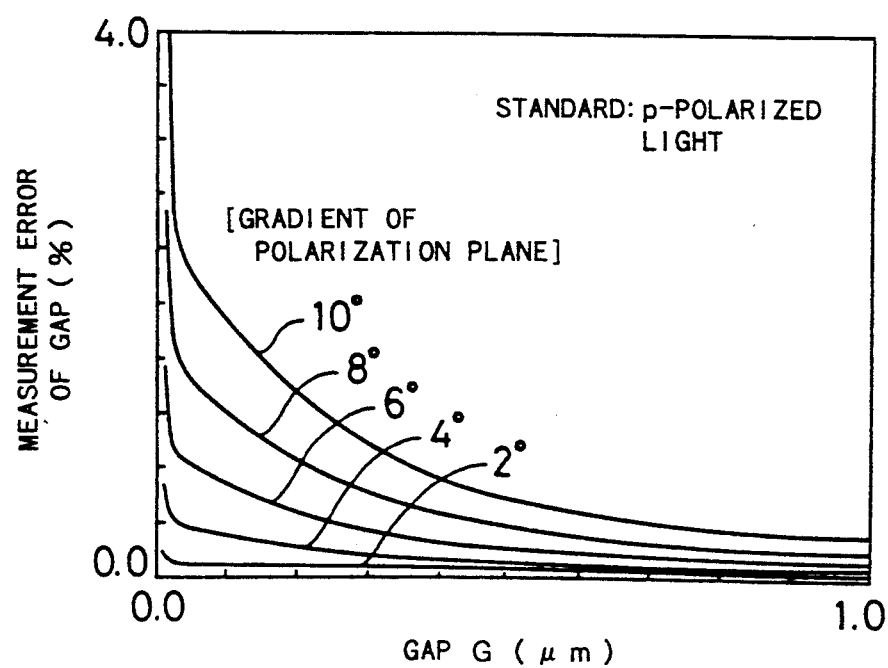
FIG. 16 is a graph showing variation in the measurement error of the gap against the dimension of the gap at certain gradients of the plane of polarization.

Gradient of the polarization plane of incident light also affects the measurement error of the gap G. FIG. 16 is a graph showing variation in the measurement error of the gap when the plane of polarization of incident light is inclined by a certain number of degrees from the standard angle at which the incident light is p-polarized light. The gradient of the plane of polarization is to be set with the precision of six degrees so that the measurement error of the gap G is within the range between positive and negative one percent.

As described above, high-precision gap measurement utilizing the tunneling of the electric field requires the high precision setting of the incident angle and the gradient of the plane of polarization in the optical system. The following preferred embodiments of the present invention are optical measuring devices in which the incident angle and the gradient of the plane of polarization can be set with high precision.

F. Fourth Embodiment

Figure 17:
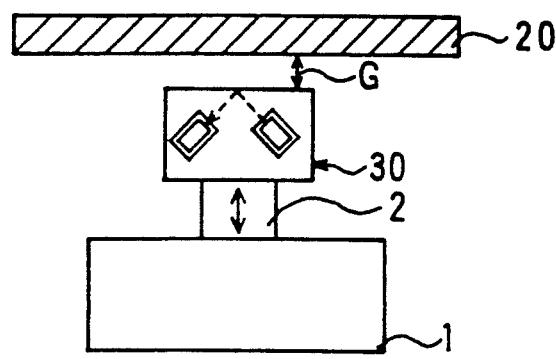
FIG. 17 is a schematic view showing structure of a gap measuring device.

FIG. 17 is a schematic view illustrating the structure of a proximity gap measuring device for determining a gap utilizing the principles described above. The proximity gap measuring device includes: a base 1; a piezoelectric actuator 2 mounted on the base and an optical measurement unit 30 mounted on the piezoelectric actuator 2. A specimen 20 is held with a holding mechanism (not shown) above the optical measurement unit 30 across a gap G. The piezoelectric actuator 2 has a piezoelectric element expanding and contracting in z direction, and controls the voltage applied to the piezoelectric element so as to move the optical measurement unit 30 in the z direction.

Figure 18:
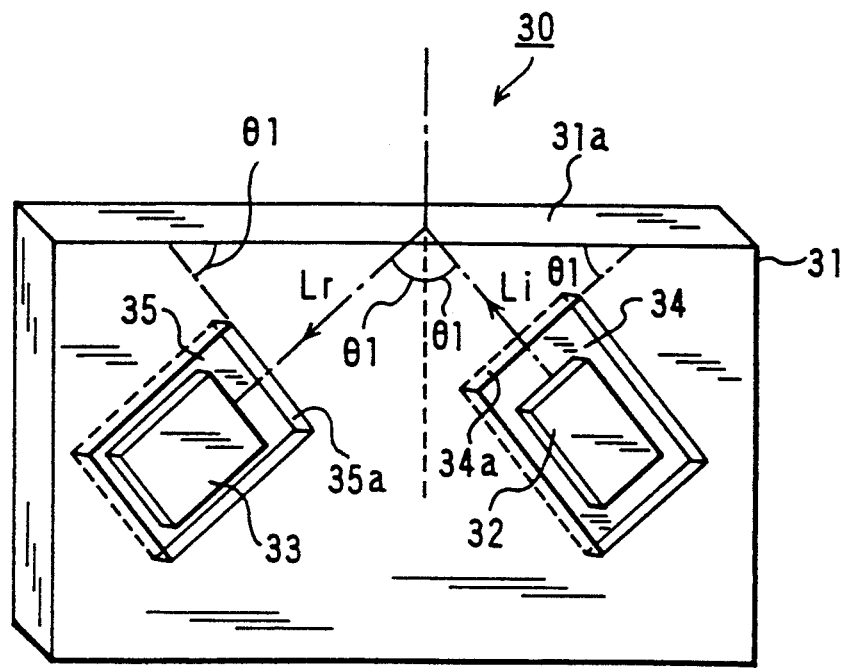
FIG. 18 is a perspective view illustrating an optical measurement unit as a first embodiment.

FIG. 18 is an enlarged perspective view illustrating the optical measurement unit 30, which includes a translucent substrate 31 working as an optical waveguide, a semi-conductor laser 32, for a GaAlAs laser, and a photodiode 33. The semi-conductor laser 32 and the photodiode 33 are respectively fitted in concaves 34 and 35 formed on one main surface of the substrate 31. The substrate 31 is made of $SiO_2$, $LiNbO_3$, or optical glass.

A laser beam Li emitted from the semi-conductor laser 32 enters a wall 34a of the concave 34 on the substrate 31 at the incident angle of ninety degrees, and then enters a reflecting surface 31a or the top surface of the substrate 31 at the incident angle $\theta 1$ of forty-five degrees. Since the critical angle of incidence is 41.5 degrees under the conditions defined in Table 1, all conditions required for total reflection in terms of geometrical optics are satisfied. In general, the incident angle equal to or greater than the critical angle is essential for total reflection in geometrical optics. Reflected light Lr from the reflecting surface 31a perpendicularly passes through a wall 35a of the concave 35 and is received by the photodiode 33.

The semi-conductor laser 32 has a double hetero structure (DH structure) of, for example, GaAlAs/GaAs/GaAlAs. The laser 32 produces linearly polarized light parallel to the joint of the DH structure. Namely, the gradient of the plane of polarization of the laser beam entering the substrate 31 is determined by the direction of the joint of the DH structure. For example, the semi-conductor laser 32 having a GaAlAs layer or GaAs layer parallel to the main surface of the substrate 31 emits a laser beam p-polarized against the reflecting surface 31a.

The dimension of the gap G is determined according to the following process. A laser beam Li is emitted while the gap G is set to be several times the wavelength λ of the laser beam Li. The intensity of the reflected light Lr received by the photodiode 33 is determined in this state. When the gap G is set several times the wavelength λ, no transmission of light wave across the gap is observed, and the laser beam Li is totally reflected at the reflecting surface 31a. The intensity of the reflected light Lr detected by the photodiode 33 under this condition represents the intensity Pi of the incident light Li. The piezoelectric actuator 2 is then driven to move the optical measurement unit 30 in the z direction by such an amount that the gap G is set to be approximately the same as the wavelength λ of the laser beam Li. The laser beam Li is again emitted, and the intensity Pr of the reflected light Lr is measured by the photodiode 33. This time, part of the light wave is transmitted into the specimen 20 as described above. The reflectance Rr is determined by dividing the intensity Pr of the reflected light in the second measurement by the intensity Pi of the incident light in the first measurement. The transmittance Rt ($=1-Rr$) is also obtained by simple subtraction. When the specimen 20 is made of silicon and the incident light Li is s-polarized light, the gap G responsive to the transmittance Rt is determined by using the data on the graph of FIG. 5A (or the data of FIG. 5B in the case of p-polarized light).

The dimension of the gap G can be determined according to a look-up table representing, for example, the relationship shown in FIG. 5A, or according to the equation (6a) representing the relationship. In the former case, the value of the gap G is obtained directly from the data in the look-up table or by interpolation thereof. Other functions representing the relationship between the transmittance Rt or the reflectance Rr and the gap G can be used in place of the equation (6a); for example, high order, logarithmic, and exponential functions.

The wall 31a of the substrate 31 is formed by cutting and polishing optical glass, while the concaves 34 and 35 are formed by etching. The wall 34a of the first concave 34 is formed in such a manner that the angle between the wall 34a and the reflecting surface 31a is equal to the incident angle $\theta 1$ of the laser beam Li on the reflecting surface 31a. The wall 35a of the second concave 35 is also formed so that the angle between the wall 35a and the reflecting surface 31a is equal to the incident angle $\theta 1$. Since the surface 31a and the walls 34a and 35a are formed without much difficulty to make the above angles, the incident angle $\theta 1$ is readily set with the precision of 0.1 degree.

The semi-conductor laser 32 and the photodiode 33 are respectively fixed on the bottom of the concaves 34 and 35 with an adhesive or the like. The direction of polarization of laser beam emitted from the semi-conductor laser 32 is checked with high precision before the mounting of the laser 32 on the substrate 31. Accordingly the direction of polarization of the incident light Li entering the top surface 31a of the substrate 31 is easily set with the precision of six degrees from the p-polarization.

In the optical measurement unit 30 shown in FIG. 18, both the incident angle $\theta 1$ and the direction of polarization of the incident light Li are set with relatively high precision, and thereby the gap G is precisely and accurately measured.

Since the semi-conductor laser 32 and the photodiode 33 are fixed on the substrate 31 in the first embodiment, even any undesirable vibration given from the outside rarely affects the positional relation between those elements.

Each of the semi-conductor laser 32 and the photodiode 33 is several hundred micrometer square. The smallness of these elements allows the dimensions of the optical measurement unit 30 and those of the whole proximity gap measuring device to be reduced.

G. Fifth Embodiment

Figure 19:
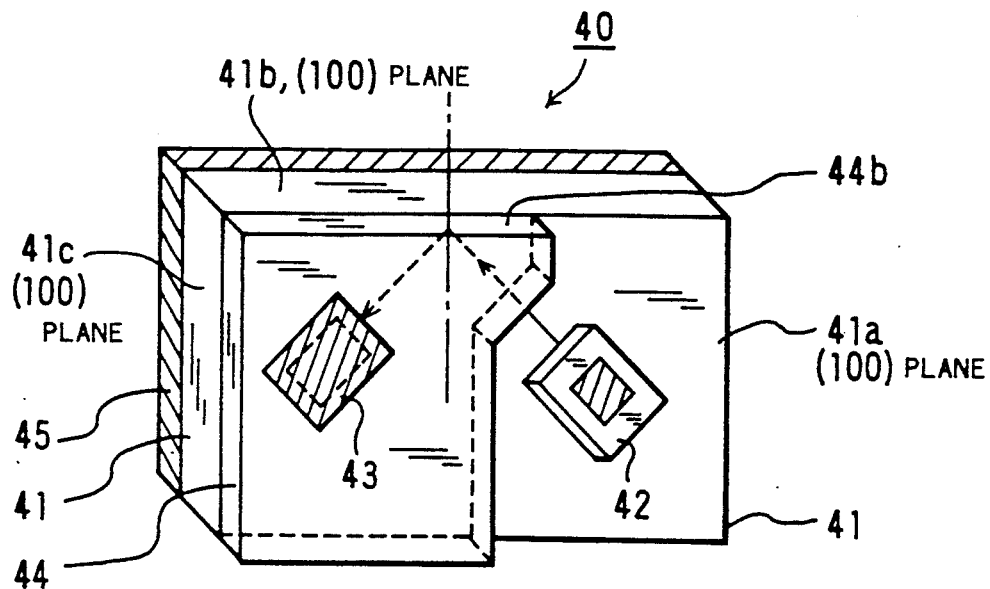
FIG. 19 is a perspective view illustrating another optical measurement unit as a second embodiment.

FIG. 19 is a perspective view illustrating another optical measurement unit 40 embodying the invention. The optical measurement unit 40 has a distributed feedback semi-conductor laser or DFB laser 42, a Schottky barrier photodiode 43, and a GaAlAs waveguide layer 44 integrally formed on a first main surface 41a of a plane (100) of a GaAs substrate 41. An electrode 45 is formed on a second main surface or rear surface of the substrate 41.

Figure 20A:
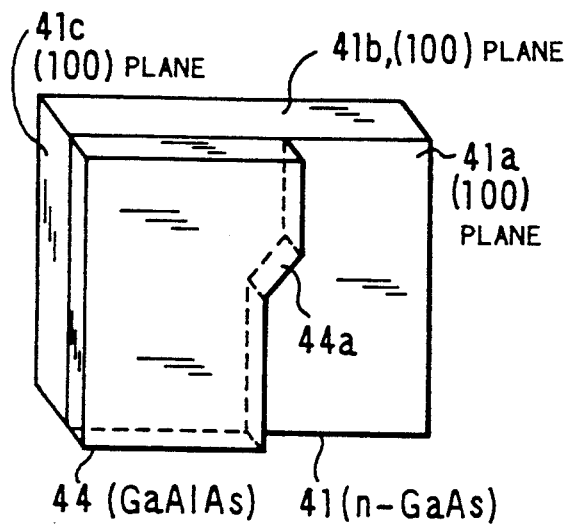
FIGS. 20(a) through 20(e) are explanatory views showing the manufacturing process of the optical measurement unit of FIG. 19.

FIGS. 20(a) through 20(e) are explanatory views showing manufacturing steps of the optical measurement unit 40. First, the GaAs substrate 41 is prepared as shown in FIG. 20(a). The main surface 41a, a top surface 41b, and a side surface 41c of the substrate 41 are all cleavage (100) planes which are crystallographically equivalent to one another.

A GaAlAs crystalline layer is then epitaxially formed on the main surface 41a of the substrate 41. Part of the GaAlAs crystalline layer is removed by the photo lithography, and the waveguide layer 44 having the shape shown in FIG. 20(a) is accordingly generated. The waveguide layer 44 has a side surface which includes two vertical flat parts and a slope 44a connecting the two flat parts. The slope part 44a of the side surface of the waveguide layer 44 forms a plane of incidence for the laser beam. The incidence plane 44a is perpendicular to the main surface 41a of the substrate 41.

Figure 20B:
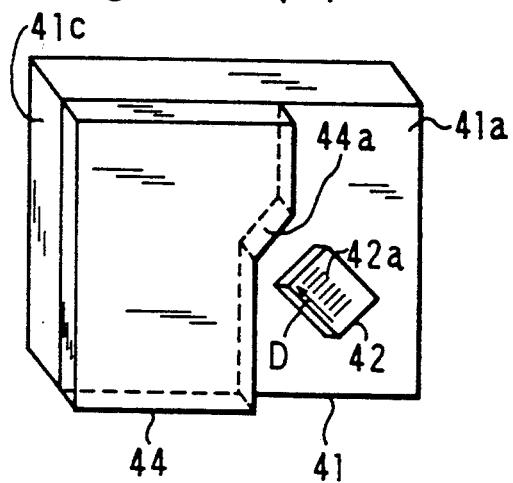

The semi-conductor laser 42 is then formed on the main surface 41a of the substrate 41 as shown in the structure of FIG. 20(b). The semi-conductor laser 42 is a distributed feedback (DFB) laser composed of, for example, AlGaAs/GaAs layers. The AlGaAs and GaAs layers are respectively formed parallel to the main surface 41a of the substrate 41 by epitaxial growth. Details of the structure and characteristics of such DFB lasers should be referred to 'Semi-Conductor Laser and Integrated Optics' (Yasuharu SUEMATSU; Ohm-sha; Apr. 25, 1984, pp 313-319), which is incorporated herein by reference. Through the manufacture process to FIG. 20(b), an electrode is not yet formed on the top surface of the semi-conductor laser 42.

In a typical DFB laser, a grating or diffraction grating is formed on a specified AlGaAs layer by holographic exposure so as to be used as a resonator for laser beam. A grating 42a is schematically drawn with parallel lines shown in FIG. 20(b). A laser beam emitted from the semi-conductor laser 42 travels in the direction defined by the projections and grooves of the grating 42a, that is, the direction D shown in FIG. 20(b). The accurate setting of the direction D of the grating 42a determines the direction of emission of the laser beam with high precision. When holographically exposing the grating 42a, the direction of the substrate 41 is adjusted in advance by rotating the substrate 41 around an axis perpendicular to the sheet of FIG. 20, while irradiating one of the cleavage planes, for example the side surface 41c for example, of the substrate 41, with the laser beam of a He-Ne laser and measuring the light reflected at the cleavage plane 41c. In this manner, the direction D of the grating 42a formed by holographic exposure is set to be perpendicular to the plane of incidence 44a of the waveguide layer 44.

Since the active layer of the DFB laser 42 is composed of GaAs, the waveguide layer 44 made of GaAs would absorb the laser beam emitted from the DFB laser 42. The waveguide layer 44 is thus preferably composed of GaAlAs which absorbs less of the laser beam.

Figure 21:
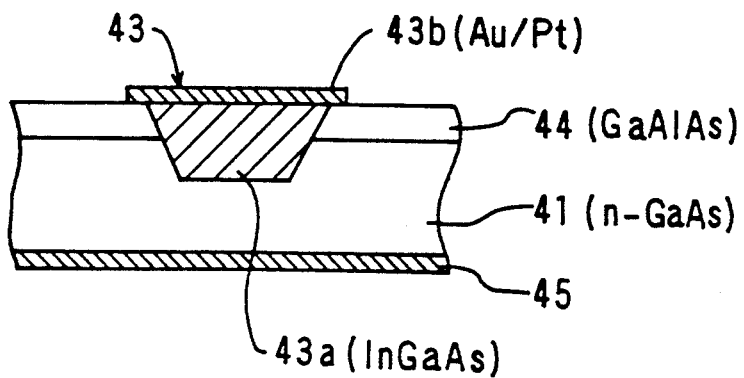
FIG. 21 is a cross sectional, view illustrating the structure of a Schottky barrier photodiode.
Figure 20C:
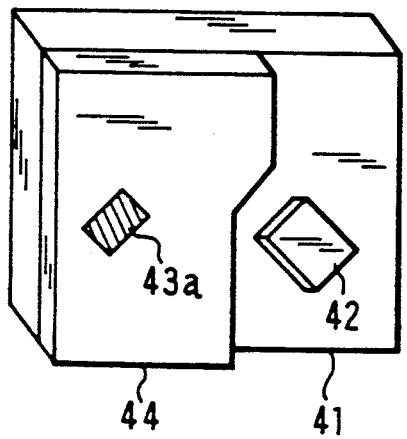

In the next step, an InGaAs layer 43a, which is a constituent of the photodiode 43, is formed on part of the waveguide layer 44 as shown in FIG. 20(c). In this step, a window or a recess is first formed in part of the waveguide layer 44 by conventional etching, and InGaAs is then embedded in the window by the molecular beam epitaxy (MBE method) or by the metal-organic chemical vapor deposition (MOCVD method). FIG. 21 is the cross sectional view of the photodiode 43. The InGaAs layer 43a is formed to pass through the waveguide layer 44a and be in contact with part of the substrate 41. The Schottky barrier photodiode 43 consists of the InGaAs layer 43a, an Au/Pt electrode 43b formed in the subsequent process, and the electrode 45 located on the rear surface of the substrate 41. Through the manufacturing process to FIG. 20(c), the electrodes 43b and 45 shown in FIG. 21 are not yet formed.

Figure 20D:
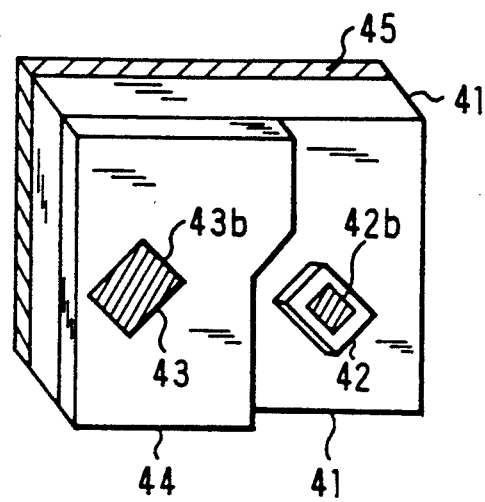
Figure 20E:
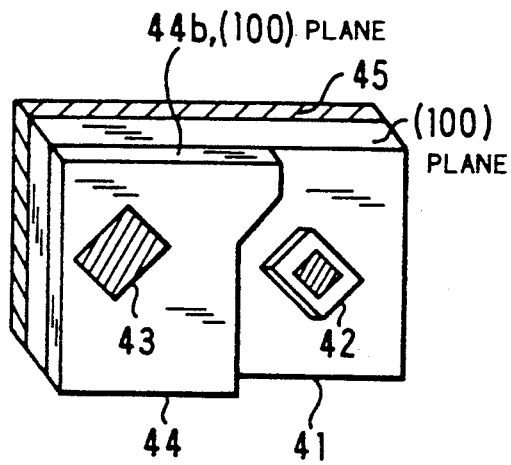

The electrode 43b of the photodiode 43, an electrode 42b of the semi-conductor laser 42 and the electrode 45 on the rear surface of the substrate 41 are then formed as shown in FIG. 20(d).

The upper ends of the substrate 41 and the waveguide layer 44 are cleaved to form cleavage planes (100). A plane 44b, or the top surface of the waveguide layer 44, forms a plane of reflection for laser beam.

As described above, the optical measurement unit 40 has the semi-conductor laser 42, the photodiode 43, and the waveguide layer 44 formed on the main surface 41a of the substrate 41. The integrated arrangement of such optical elements on the substrate 41 allows precise adjustment of the incident angle of the laser beam. More particularly, the cleavage plane forming the reflecting surface 44b of the waveguide layer 44 allows the incident angle to be adjusted and controlled with high precision. In the embodiment, the semi-conductor laser 42 is formed on the substrate 41 by epitaxial growth, and thus the direction of polarization of the laser beam is precisely and accurately determined. Accordingly, the optical measurement unit 40 of the embodiment executes precise and accurate measurement of a gap.

The integrated arrangement of the optical elements on the substrate 41 makes the whole device insensitive to external vibration and allows stable measurement.

H. Sixth Embodiment

Figure 22:
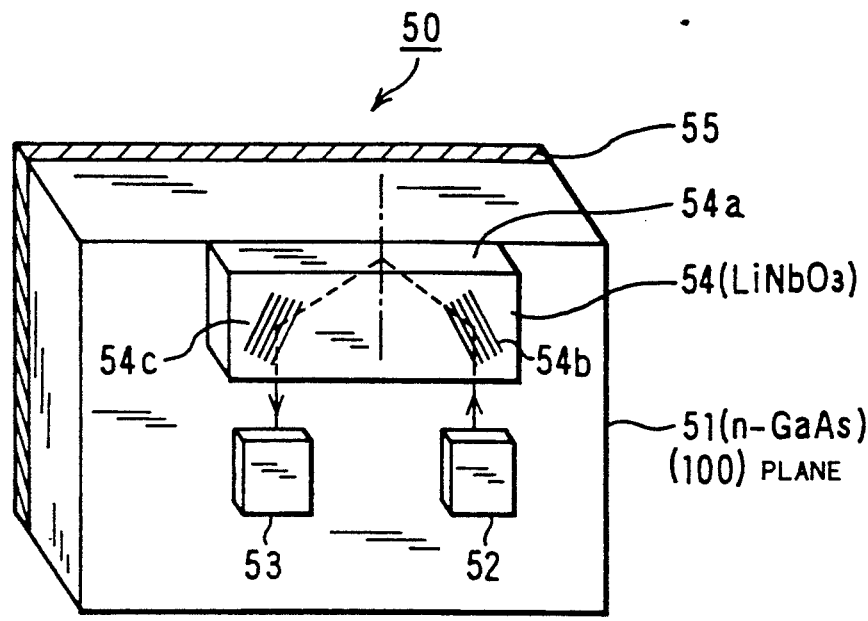
FIG. 22 is a perspective view illustrating an optical measurement unit as a third embodiment.

FIG. 22 is a perspective view illustrating another optical measurement unit 50 embodying the present invention. The optical measurement unit 50 has a semiconductor laser 52, an optical detector 53, and a LiNbO$_3$ waveguide layer 54 formed on a first main surface 51a of the plane (100) of a GaAs substrate 51. An electrode 55 is formed on a second main surface or rear surface of the substrate 51. Two diffraction gratings 54b and 54c for converting the optical path of laser beam are formed on the surface of the waveguide layer 54.

Figure 23:
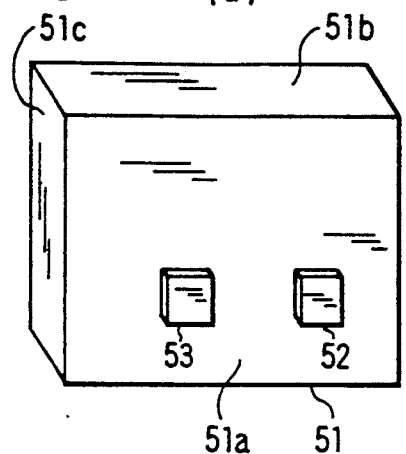
FIGS. 23(a) through 23(e) are explanatory views showing manufacturing process of the optical measurement unit showing of FIG. 22.
Figure 23:
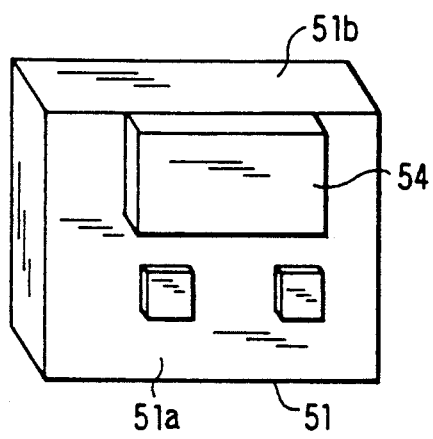
Figure 23:
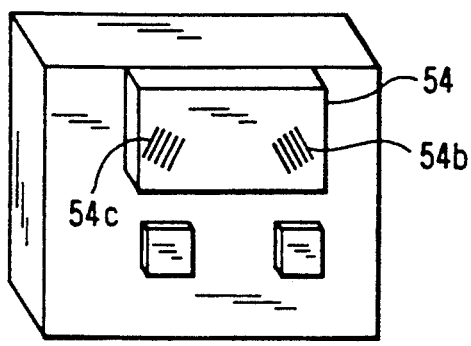
Figure 23:
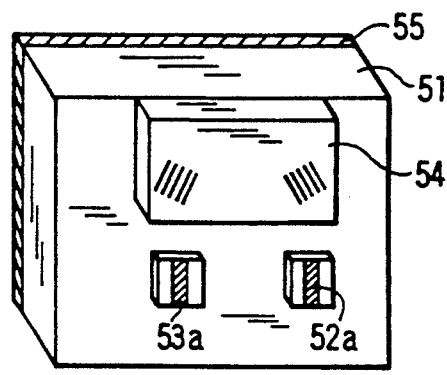
Figure 23:
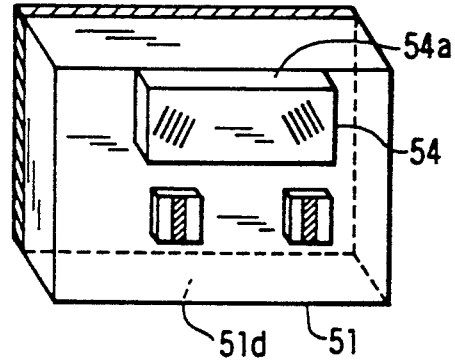

FIGS. 23(a) through 23(e) are explanatory views showing manufacturing steps of the optical measurement unit 50. First, the GaAs substrate 51 shown in FIG. 23(a) is prepared. The main surface 51a, a top surface 51b, and a side surface 51c of the substrate 51 are cleavage planes (100) which are crystallographically equivalent to one another.

The semi-conductor laser 52 and the optical detector 53 are formed on the main surface 51a of the substrate 51 as shown in FIG. 23(a). Both the semi-conductor laser 52 and the optical detector 53 include a laser element formed by epitaxial growth. In this embodiment, reflecting surfaces of the resonator of each laser element are formed by dry etching. The reflecting surfaces of the laser elements are formed parallel to the top surface 51b of the substrate 51, which is a plane (100), because the planes (100) are easy with make parallel to each other.

Details of the structure and characteristics of such laser elements should be referred to, for example, 'Semi-Conductor Laser and Integrated Optics' (Yasuharu SUEMATSU; Ohm-sha; Apr. 25, 1984, p 378), which is incorporated herein by reference.

The LiNbO3 layer is precipitated on the main surface 51a of the substrate 51, and the waveguide layer 54 shown in FIG. 23(b) is prepared by removing part of the LiNbO3 layer by photo lithography.

Figure 24:
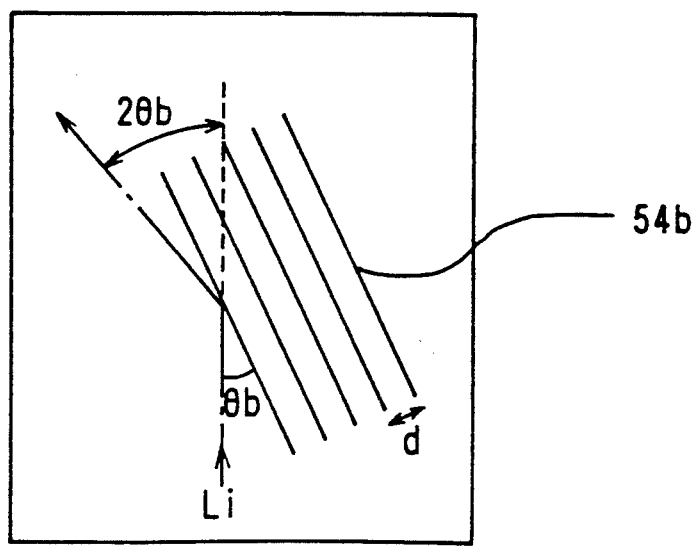
FIG. 24 is an explanatory view showing the relationship between the grating and the deflection angle of the incident light.

In the next step, the gratings 54b and 54c are formed on the surface of the waveguide layer 54 by holographic exposure as shown in FIG. 23(c). FIG. 24 is an explanatory view illustrating Bragg reflection in which the grating 54b deflects the direction of the incident light Li. As shown in FIG. 24, the direction of the incident light Li is shifted by $2\theta b$, that is, twice the incident angle $\theta b$ of the incident light Li on the grating 54b. For example, the optical path of the incident light Li is shifted by 45 degrees by arranging the projections and grooves of the grating 54b at the angle of 22.5 degrees to the incident light Li. The relationship between the wavelength $\lambda$ of laser beam and the grating constant d of the grating 54b is expressed as:

$$2d \sin\theta b = n \lambda \qquad (8)$$

where n is an integer.

For example, when the wavelength $\lambda$ of laser beam is 0.84 micrometers, the grating constant d of the grating 54b is 1.098 micrometers.

The direction of the projections and grooves of the gratings 54b and 54c is adjusted in the same manner as that of the grating 42a on the semi-conductor laser 42 of the optical measurement unit 40 described above.

In the next step, electrodes 52a and 53a are respectively formed on the surface of the semi-conductor laser 52 and the optical detector 53, and the electrode 55 on the rear surface of the substrate 51 as shown in FIG. 23(d).

The top surface 54a of the waveguide layer 54 functioning as the reflecting surface the laser beam is formed by polishing the surfaces of the waveguide layer 54 and the substrate 51. During polishing, a bottom surface 51d of the substrate 51 (FIG. 23(d)), previously formed as a cleavage plane, is fixed to a jig for polishing, so that the reflecting surface 54a for the laser beam is finished to become parallel to the bottom surface 51d of the plane (100). Current optical polishing technologies can make the precision between the parallel planes as high as five seconds, thus easily fulfilling the required precision of the incident angel and the plane of polarization of six degrees.

In the optical measurement units 40 and 50 shown in FIGS. 20 and 22, the direction of emission of semi-conductor laser, the plane of incidence for laser beam, and the plane of reflection are set with respect to the cleavage plane of the substrate. The incident angle of laser beam on the reflecting surface and the gradient of the plane of polarization are thereby determined with high precision. Accordingly, the gap is accurately and precisely measured with those optical measurement units.

I. Seventh Embodiment

Figure 25:
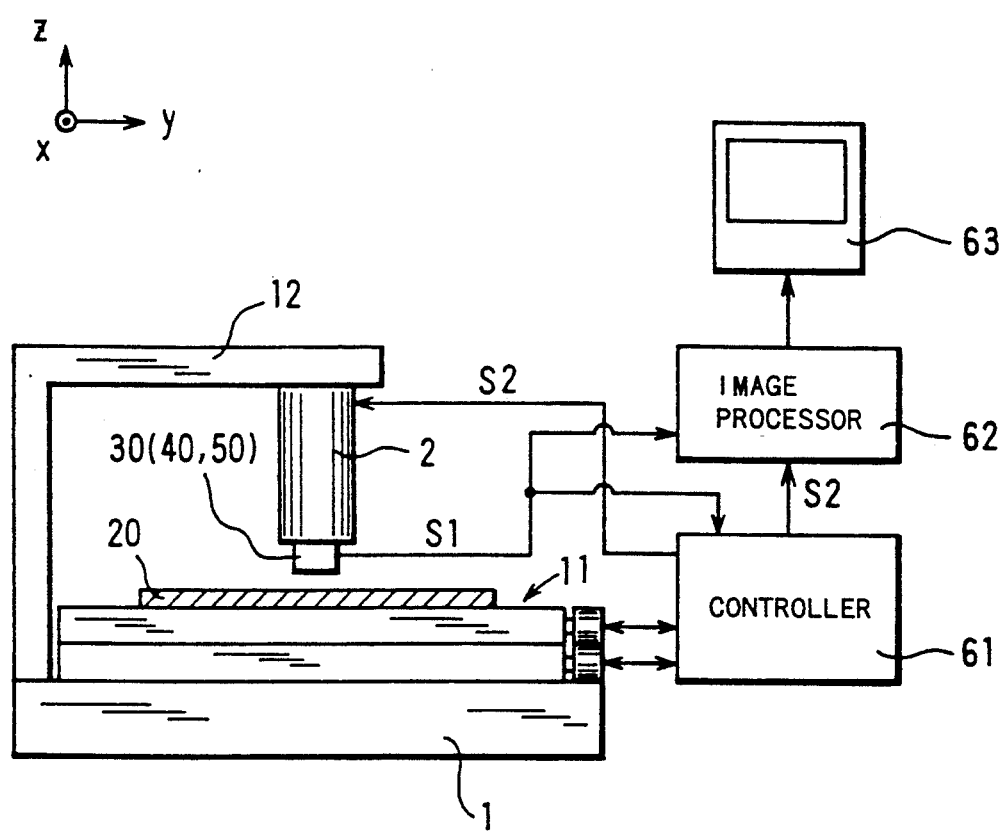
FIG. 25 is a schematic view illustrating an example of a device for detecting the surface condition.

FIG. 25 is a schematic view illustrating another embodiment of the invention, an apparatus for detecting the surface condition, which utilizes the optical measurement unit described above. The surface-condition detecting apparatus is efficiently used for measuring unevenness on the surface of a specimen 20, like a silicon wafer.

The surface-condition detecting apparatus includes: a base 1; an x-y table or a sample table 11 mounted on the base 1; an upright support 12 on disposed the base 1; a piezoelectric actuator 2 disposed below the support 12; a controller 61 for controlling the x-y table 11 and the piezoelectric actuator 2; an image processor 62; and a monitor 63. The x-y table 11 is positioned in the x and y directions with two precision ball threads driven by two driving motors.

Unevenness on the surface of the specimen 20 is detected according to the following steps After the intensity of reflected light is measured by the optical measurement unit 30 (or 40, or 50), a signal S1 proportional to the intensity of reflected light is output from the optical measurement unit 30 to the controller 61. The controller 61 then regulates the expansion of the piezoelectric actuator 2 to make the level of the signal S1 constant, in other words, to make the gap between the optical measurement unit 30 and the specimen 20 constant. Since the piezoelectric actuator 2 is controlled to maintain the constant gap, the expansion of the piezoelectric actuator 2 represents unevenness on the surface of the specimen 20. In general, the expansion of the piezoelectric actuator 2 is proportional to the level of a control signal S2 output from the controller 61. The image processor 62 detects the unevenness on the surface of the specimen 20 based on the control signal S2 output from the controller 61. The image processor 62 can detect the unevenness based on the signal S1 given from the optical measurement unit 30 alternatively.

While the controller 61 actuates the x-y table 11 to move the specimen 20 in the x and y directions, the unevenness on the surface over the specimen 20 is efficiently measured two-dimentionally. A resultant image showing the unevenness on the surface of the specimen 20 is displayed on the monitor 63.

Figure 26:
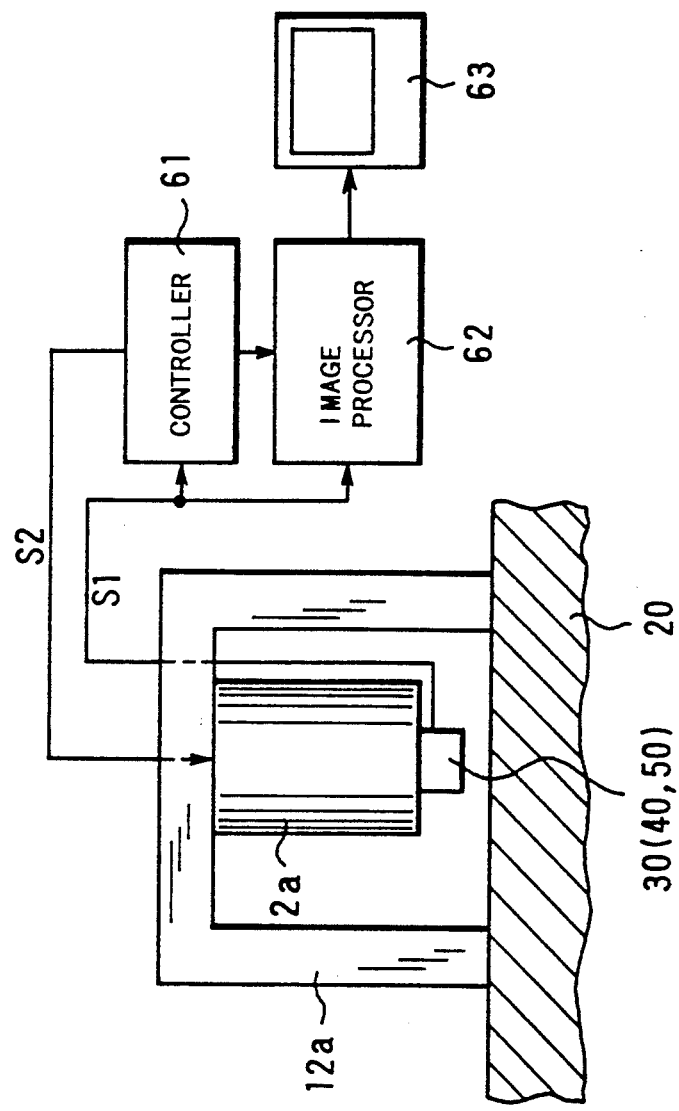
FIG. 26 is a schematic view illustrating another example of a device for detecting the surface condition.

FIG. 26 is a schematic view illustrating a further embodiment of the invention, that is, another apparatus for detecting the surface condition. The surface-condition detecting apparatus includes: a support 12a mounted on the specimen 20; a three-dimensional piezoelectric actuator unit 2a disposed below the support 12a; the controller 61; the image processor 62; and the monitor 63.

Figure 27:
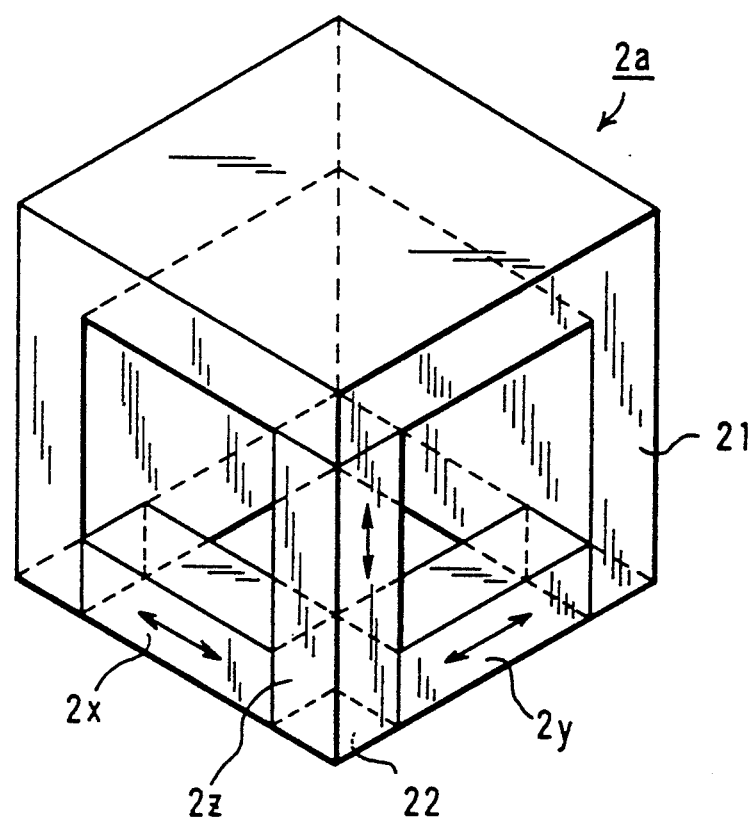
FIG. 27 is a schematic view illustrating the structure of a three-dimensional piezoelectric actuator unit.

FIG. 27 is a schematic view showing an example of the three-dimensional piezoelectric actuator unit 2a, which includes three piezoelectric actuators 2x, 2y, and 2z respectively expanding in x, y, and z directions and being attached to inner surfaces of a base table 21, which has a shape of a cube a part of which is cut out into a smaller cubic space. The optical measurement unit 30 is fixed to a bottom surface 22 of the z-direction piezoelectric actuator 2z.

Operation of the surface-condition detecting apparatus of FIG. 26 is similar to that of FIG. 25 except for the following detail. In the apparatus of FIG. 26, the controller 61 controls the expansion of the three-dimensional piezoelectric actuator unit 2a in the x, y, and z directions, and the image processor 62 thus detects unevenness in a narrower area with higher precision compared with the apparatus of FIG. 25.

Figure 28:
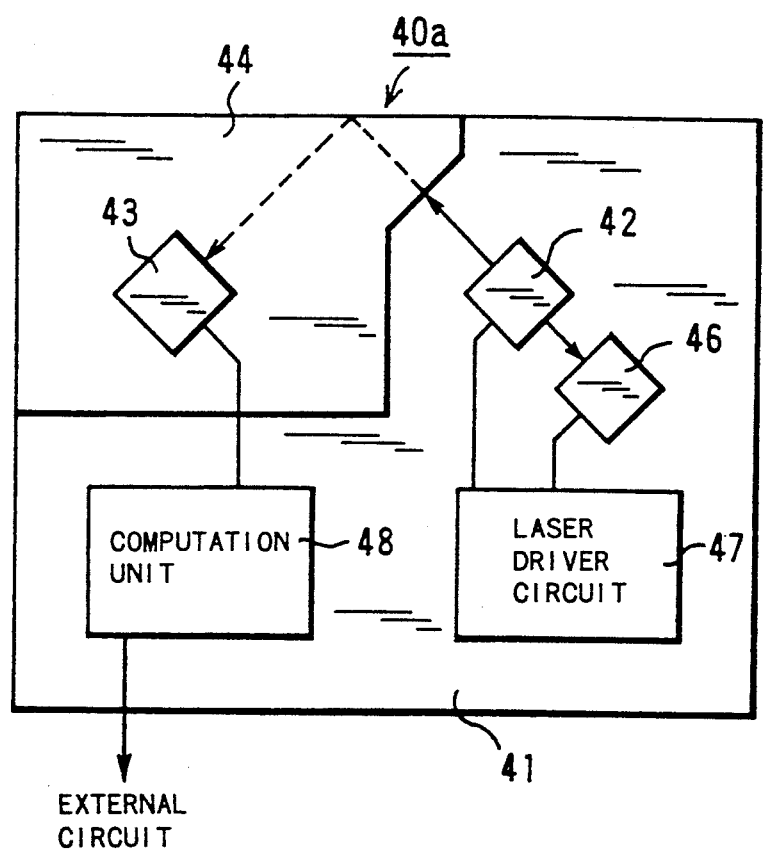
FIG. 28 is a schematic view showing the modification of the optical measurement unit.

The invention is not limited to the above embodiments, and there can be many modifications and changes without departing from the scope of the invention as follows:

(1) In the above embodiments, the semi-conductor laser, the optical detector, and the waveguide layer with a reflecting surface are formed on the substrate, but other circuits can also be formed on the substrate. FIG. 28 is a schematic view showing a modified optical measurement unit 40a, which includes: a photodiode 46 for detecting and measuring the intensity of light emitted from the semi-conductor laser 42; a laser driver unit 47 for controlling and maintaining the intensity of light emitted from the semi-conductor laser 42 responsive to the output of the photodiode 46; and a computation unit 48, as well as the elements shown in FIG. 19.

When the substrate 41 is made of GaAs, the photodiode 46, the laser driver unit 47, and the computation unit 48 can be integrated as a GaAs integrated circuit. This allows to make the whole proximity gap measuring device and the surface-condition detecting apparatus compact and small.

(2) Although the semi-conductor substrate and other semi-conductor elements are made of GaAs in the optical measurement units 40 and 50 in the above embodiments, they can be made of other semiconductor materials such as silicon and chemical semiconductor material.

According to the present invention, a laser beam is reflected by a reflector under a condition of total reflection in terms of geometrical optics, and part of laser reflected from the reflecting surface is transmitted into a specimen across a narrow gap by tunnel effect, where the intensity of the reflected light varies with the dimension of the gap. The optical measuring device of the present invention measures and determines the narrow gap and surface unevenness based on the intensity of reflected light and thus attains precise and accurate measurement.

Since the semi-conductor laser, the waveguide member, and the light receiving element are integrally formed on the substrate, the device is insensitive to undesirable vibration and influence of the environmental temperature, thus attaining high precision measurement.

An error of the incident angle of laser beam on the reflecting surface generally affects the precision of measurement of the gap. In the present invention, however, the semi-conductor laser and the photosensor are formed on the semi-conductor substrate by epitaxial growth, and the reflecting surface of the waveguide is made parallel to a specific cleavage plane of the semiconductor substrate. The direction of the, reflecting surface and thereby the incident angle of the laser beam are accurately and precisely determined. Namely, devices according to the present invention measure a gap or surface unevenness with high precision.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for measuring a gap between a surface of a specimen and a specific member, comprising:
    a substrate;
    a laser source mounted on said substrate for emitting a laser beam having a wavelength;
    an optical waveguide, having a reflecting surface comprising said specific member, for reflecting said laser beam at said reflecting surface such that geometric optical total reflection of said laser beam occurs and the intensity of said laser beam reflected from said reflecting surface is a maximum when said gap exceeds the wavelength of said laser beam, the intensity of said laser beam reflected from said reflecting surface decreasing from said maximum when said gap is less than or equal to the wavelength of said laser beam, said substrate and said optical waveguide constituting a unitary member transmitting light; and
    a photosensor mounted on said substrate, for measuring the intensity of said laser beam reflected by said reflecting surface.

2. An optical measuring device in accordance with claim 1, wherein
    said laser source and said photosensor are fixed on said substrate with adhesive.

3. A device for measuring a gap between a surface of a specimen and a specific member, comprising:
    a semi-conductor substrate having a cleavage plane;
    a laser source made of semi-conductor material mounted on said semi-conductor substrate for emitting a laser beam having a wavelength;
    an optical waveguide, having a reflecting surface comprising said specific member, for reflecting said laser beam at said reflecting surface such that geometric optical total reflection of said laser beam occurs and the intensity of said laser beam reflected from said reflecting surface is a maximum when said gap exceeds the wavelength of said laser beam, the intensity of said laser beam reflected from said reflecting surface decreasing from said maximum when said gap is less than or equal to the wavelength of said laser beam, said reflecting surface of said optical waveguide being arranged parallel to said cleavage plane of said semi-conductor substrate; and
    a photosensor made of semi-conductor material mounted on said semi-conductor substrate for measuring the intensity of said laser beam reflected by said reflecting surface.

4. An optical measuring device in accordance with claim 3, wherein
    said optical waveguide is made of a semi-conductor material; and
    said photosensor is a photo diode of a Shottky barrier type formed in a part of said optical waveguide.

5. An optical measuring device in accordance with claim 3, wherein
    each of said substrate, said laser source, and said photosensor is made of a semi-conductor material including gallium and arsenic; and
    said optical waveguide is made of a semi-conductor material including gallium, aluminum and arsenic.

6. An optical measuring device in accordance with claim 5, wherein said laser source comprises a resonator utilizing a Bragg reflection of light wave.

7. An optical measuring device in accordance with claim 3, wherein said optical waveguide comprises a diffraction grating for deflecting said laser beam to be incident on said reflecting surface such that geometric optical total reflection occurs.

8. A method of manufacturing a device for measuring a gap between a surface of a specimen and a specific member, comprising the steps of:

(a) preparing a translucent plate having a main surface and a side surface perpendicular to said main surface;

(b) shaping a first opening and a second opening in said main surface of said translucent plate, said first opening having a first wall inclined at a predetermined first angle against said side surface of said translucent plate and substantially perpendicular to said main surface of said translucent plate, said second opening having a second wall inclined at a predetermined second angle against said side surface of said translucent plate and substantially perpendicular to said main surface of said translucent plate;

(c) fixing a laser source in said first opening for emitting a laser beam to pas through said first wall of said first opening to be reflected at said side surface of said translucent plate on condition of geometric optical total reflection; and (d) fixing a photosensor in said second opening for receiving said laser beam reflected at said side surface and passing through said second wall of said second opening.

9. A method of manufacturing a device for measuring a gap between a surface of a specimen and a specific member, comprising the steps of:

(a) preparing a semi-conductor substrate;

(b) forming an optical waveguide layer on a main surface of said semi-conductor substrate by epitaxial growth;

(c) forming a laser source on said semi-conductor substrate for emitting a laser beam to be introduced into said optical waveguide layer;

(d) forming a photosensor in a part of said optical waveguide layer for receiving said laser beam; and (e) shaping side surfaces of said semi-conductor substrate and said optical waveguide layer to make a flat plane perpendicular to said main surface of said semi-conductor substrate such that said laser beam output from said laser source is reflected at said flat plane upon a condition of geometric optical total reflection and received by said photosensor.

10. A method in accordance with claim 9, wherein said step (e) comprises a step of making said flat plane parallel to a cleavage plane of said semi-conductor substrate.

11. A method in accordance with claim 10, wherein said step (d) comprises the steps of:

(c-1) forming a semi-conductor layer; and (c-2) forming a grating on said semi-conductor layer with holographic exposure, said grating functioning as a resonator of said laser source utilizing Bragg reflection of light wave.

12. A method of manufacturing a device for measuring a gap between a surface of a specimen and a specific member, comprising the steps of:

(a) preparing a semi-conductor substrate;

(b) forming an optical waveguide layer on a main surface of said semi-conductor substrate;

(c) forming a laser source on said substrate;

(d) forming a photosensor on said substrate;

(e) forming a first grating on a surface of said optical waveguide layer for deflecting a laser beam, and forming side surfaces of said semi-conductor substrate and said optical waveguide layer to make a flat plane perpendicular to said main surface of said semi-conductor substrate, whereby a laser beam output from said laser source is deflected by said first grating and reflected at said flat plane upon a condition of geometric optical total reflection and received by said photosensor.

13. A method in accordance with claim 12, wherein:

said step (e) includes a step of making said flat plane parallel to a cleavage plane of said semi-conductor substrate.

14. A method in accordance with claim 13, wherein said step (c) comprises the steps of:

(c-1) forming a semi-conductor layer; and (c-2) forming a second grating on said semi-conductor layer with holographic exposure, said second grating functioning as a resonator of said laser source utilizing a Bragg reflection of light wave.

* * * * *